United States Patent

Clark, IV et al.

[15] 3,646,524

[45] Feb. 29, 1972

[54] HIGH-LEVEL INDEX-FACTORING SYSTEM

[72] Inventors: William A. Clark, IV; Charles T. Davies, Jr., both of Poughkeepsie, N.Y.; Kent A. Salmond, Los Gatos, Calif.; Thomas S. Stafford, Boca Raton, Fla.

[73] Assignee: International Business Machines Corporation, Armonk, N.Y.

[22] Filed: Dec. 31, 1969

[21] Appl. No.: 889,462

[52] U.S. Cl. ................................................340/172.5, 444/1

[51] Int. Cl. ....................G05b 19/22, G06f 7/04, G06r 7/06

[58] Field of Search................................340/172.5; 235/147

[56] References Cited

UNITED STATES PATENTS

| | | | |
|---|---|---|---|
| 3,030,609 | 4/1962 | Albrecht | 340/172.5 |
| 3,242,470 | 3/1966 | Hagelbarger et al. | 340/172.5 |
| 3,275,989 | 9/1966 | Glaser et al. | 340/172.5 |
| 3,295,102 | 12/1966 | Neilson | 340/146.2 |
| 3,315,233 | 4/1967 | Campo et al. | 340/172.5 |
| 3,366,928 | 1/1968 | Rice et al. | 340/172.5 |
| 3,408,631 | 10/1968 | Evans et al. | 340/172.5 |
| 3,413,611 | 11/1968 | Pfuetze | 340/172.5 |
| 3,448,436 | 6/1969 | Machol, Jr. | 340/172.5 |
| 3,490,690 | 1/1970 | Apple et al. | 235/154 |
| 3,508,220 | 4/1970 | Stampler | 340/174 |

*Primary Examiner*—Paul J. Henon
*Assistant Examiner*—Jan E. Rhoads
*Attorney*—Hanifin and Jancin and Bernard M. Goldman

[57] ABSTRACT

High-level index-factoring system generates a multilevel compressed index in which the compressed key format in all levels of the index (i.e., high and low) are searchable by a single method, such as the method in allowed application serial number 788,835

The generation process includes the factoring of high-order bytes common to all uncompressed keys contributing to any compressed index block at any level; the factored high-order bytes are transferred into a compressed key in the next higher level compressed index block.

The high levels in the compressed index are built by selectively passing to the high levels the last uncompressed key (UK) used in the generation of each low-level compressed index block. The determination to pass the UK to a next higher level is made when the UK is the last UK used to generate the last-compressed key (CK) in the compressed index block at the current level. The propagation of a UK to successive high levels ends whenever the UK is used to generate a CK which does not complete a compressed index block. Thus the UK passing depends on the block completion function at successive levels.

A different sequence of UK's is received by each high level. The CK's at any high level are generated from the sequence of UK's passed to that level; each high-level CK is generated from the current and prior UK's passed to the same level. Thus each UK passed to a high level is used to generate a current CK for that level, and then the UK is stored for that level so that it can later be used in the generation of the next CK for that level when a next UK is passed to it.

The key bytes in each high-level CK are taken from the UK currently passed to that level, beginning from a leftmost byte which is dependent on whether the currently passed UK is a right-shift type, a left-shift type, or no-shift type at the respective high level. The UK type at a high level is independent of its type at a lower level because the UK sequence is different. The rightmost key byte for the respective high level CK is determined by the low-level difference byte in the same UK determined by its use in generating a CK for the low-level index; this rightmost byte is independent of the UK type at the respective high level. If the passed UK is a left- or no-shift type at the respective high level, the key bytes for the high-level CK are taken from the high-level difference byte through the low-level difference byte. If it is a right-shift type of CK at the respective high level, the key bytes are taken from its position after the high-level difference byte in the prior UK for the same high level through its low-level difference byte.

52 Claims, 15 Drawing Figures

INVENTORS
WILLIAM A. CLARK IV
CHARLES T. DAVIES, JR.
KENT A. SALMOND
THOMAS S. STAFFORD

BY Bernard M. Goldman
ATTORNEY

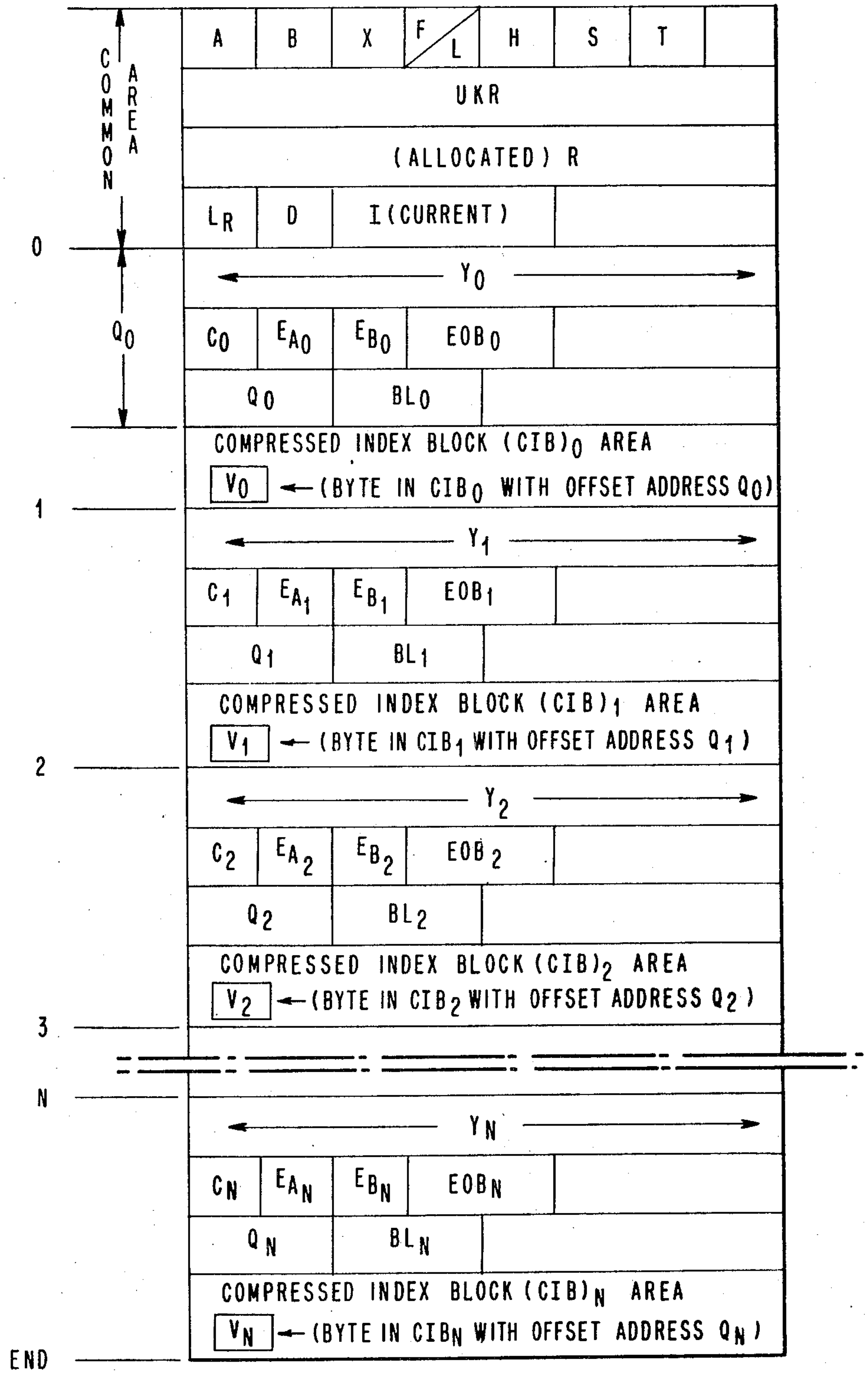
FIG. 4C (DYNAMIC STORAGE STRUCTURE)

(UK INPUT AND COMPARISON)

(COMPRESSED KEY GENERATION)

(POINTER PLACEMENT)

(COMPRESSED BLOCK OUTPUTTING)

(END OF INDEX OPERATIONS)

HIGH-LEVEL INDEX-FACTORING SYSTEM

Table of Contents

| | Col. in Specification |
|---|---|
| Abstract of the Disclosure | Front page |
| Introduction | 1 |
| Objects of the Invention | 2 |
| Definition Table | 4 |
| Symbol Table | 6 |
| Description of the Drawings | 7 |
| Multilevel Index Structuring | 7 |
| Table A—Multilevel UK Operation | 10 |
| Table B—Multilevel Compressed Index | 12 |
| Low Level Compressed Key Structuring | 14 |
| Table C | 14 |
| Legend for Table C | 15 |
| High Level Compressed Key Structuring | 16 |
| Table D | 16 |
| Table E1 | 17 |
| Table E2 | 17 |
| Table E3 | 17 |
| Legend for Tables D and E | 17 |
| Symbol Legend for FIGURES 5A–E | 20 |
| (1) Initialization and Reception of the First UK and its pointer | 22 |
| (2) Low-Level CK Operation | 23 |
| (3) High-Level CK Operation | 27 |
| (4) End of Index Operation | 29 |
| Claims | 30 |

INTRODUCTION

This invention relates generally to information retrieval and particularly to a new electronically controlled technique for generating multilevel machine-readable indexes. Basic methods and means for machine-generation and machine-searching of compressed indexes are disclosed and claimed in U.S. Pat. No. 3,593,309 and application Ser. No. 788,835 and 788,876 filed on Jan. 3, 1969 for a single-level, and a multilevel compressed index generation method and means is disclosed and claimed in U.S. Pat. No. 3,603,937 (application Ser. No. 836,930), all owned by the same assignee as the subject application.

Information of every sort is being generated at an ever-increasing rate. It is becoming ever more apparent that a bottleneck often exists in not being able to quickly retrieve an item of information from the mass of information in which it is buried. Although much work has been done on information retrieval, no overall solution has been found thus far, even though many sophisticated information retrieval techniques have been conceived for accessing of information involving large numbers of documents or records.

Within the information retrieval environment, the invention relates to a tool useful in controlling a machine to locate information indexed by keys. Any type of alphanumeric keys arranged in sorted sequence can be converted into multilevel compressed-key form by the subject invention. Each compressed key represents a boundary (either high or low) for the uncompressed key it represents. Each compressed key may have associated with it data, or the location of one or more items of information it represents. The location information may be an attached address, pointer, or it may be derivable from a key itself by means not part of this invention.

The subject invention is inclusive of an inventive method which provides compressed keys within a multilevel index to enable a large increase in the speed of searching the index compared to searching the index in uncompressed form.

Methods and means for searching an uncompressed multilevel index are known and have been disclosed in the past. Uncompressed index-searching is being electronically performed with computer systems, using special access methods, control means, and electronic cataloging techniques. U.S. Pat. Nos. 3,409,631 to J. R. Evans, 3,315,233 to R. De Camp et al.; and 3,366,928 to R. Rice et al.; 3,242,470 to Hagelbarger et al.; and 3,030,609 to Albrecht are examples of the state of the art.

Current computer information retrieval is limited in a number of ways, among which is the very large amount of storage required. The uncompressed-key format in multilevel index form results in having to scan a large number of bytes in every key entry while looking for a search argument. This is time-consuming and costly when searching a large index, or when repeatedly searching a small index. It is this area which is attacked by the subject invention, which greatly reduces the number of scanned bytes per key entry in a searched index. A result obtained is smaller search-storage requirements and faster searching due to less bytes needing to be machine-sensed. A significant increase in searching speed results without changing the speed of a computer system.

Current electronic computer search techniques, such as in the above-cited patents, have uncompressed keys accompanying records on a disk or drum for indexing the subject matter contained in an associated record. A search for the associated record may be done either by the key or by the address of the record. For example in U.S. Pat. Nos. 3,408,631; 3,350,693; 3,343,134; 3,344,402; 3,344,403 and 3,344,405 an uncompressed key can be indexed on a magnetically-recorded disk. A key in a multilevel environment can be electronically scanned by a search argument for a compare-equal condition. Upon having a compare-equal condition, a pointer address associated with the respective uncompressed key is obtained and used to retrieve the record at a lower level represented by the key which may be elsewhere on the same device or on a different device. This pointer, for example, may include the location on the disk device, or on another device, where the next lower level record is recorded. The lowest index level locates the data record being sought, and the record may then be retrieved and used for any required purpose.

OBJECTS OF THE INVENTION

This invention pertains to generating a compressed multilevel index. The compression removes a type of redundancy attributable to the sorted nature of the index, i.e., it removes a sorting induced type of redundancy, and only retains the minimum information needed for searching or insertion. The correct generation of a compressed multilevel index involves subtilties and criticalities that are not apparent from uncompressed multilevel indexes. Recognition of these unobvious characteristics is essential in order for the index to correctly fetch a required record in the next lower level of the index before the correct data record can be fetched.

It is therefore an object of this invention to provide a novel method and system which can generate a multilevel index compressed by removal of sorting-redundancy and yet retains sufficient information to be able to fetch the correct next lower level index record.

It is another object of this invention to provide a novel method and system to generate a multilevel compressed index to reduce the number of searchable index bytes needed to be stored, when compared to a corresponding uncompressed multilevel index. This greatly increases the machine search speed in relation to the speed of searching the sorted uncompressed source index at the same machine byte rate.

It is a further object of this invention to generate a compressed index in which the size of multilevel key entries is largely independent of the length of corresponding keys. For example, a pointer to a lower level index is accompanied by a compressed key having only enough noise bytes from a represented uncompressed key (which could have hundreds or thousands of bytes) to delineate the boundary of the index block addressed by the pointer. The amount of index compression is primarily dependent on the "tightness" of the index, that is the amount of variation in the sorted relationship among the uncompressed keys in the index.

More specific objects of this invention are:

A. To concurrently generate all levels of a multilevel compressed index in one pass of the UK-input stream. The block size may vary at the different levels.

B. To generate a multilevel index in which sufficient noise bytes are provided at each high index level ($I \neq 0$) in order to unambiguously direct a search operation to the correct next lower level block in the index structure.

C. To generate each high-level compressed key with a format of FLK or LFK, in which F is the length of the high order factor field not appearing in the compressed key, L is the length of the key byte field appearing within the compressed key, and K are key bytes which may appear in the compressed key.

D. To generate a multilevel index in which the same compressed key format is the same at all high levels as at the low level.

E. To generate a high-level index having a compressed block format which permits searching by any uncompressed search argument.

F. To generate a multilevel compressed index which is searchable from its apex to find a data block in which:

1. only one compressed block is accessed per index level, and
2. the correct data block is found if the search argument is represented in the compressed index, or
3. the search argument is not represented in the index, and the high1level search indicates the block in the index where the search argument should be represented if it is later decided to put it into the index.

G. To generate a block format for a high-level compressed index which permits searching through all index levels by a search argument that is not in the original UK-index from which the compressed index is constructed, and the search argument would fall between adjacent uncompressed keys represented: (1) within a single compressed index block, or (2) in two compressed index blocks.

The invention may concurrently generate all index levels while making a single pass of the sorted uncompressed index. Each uncompressed key in the uncompressed index need only be read once during the compressed index generation. A compressed key entry is made in one or more high levels only when a block has become full of compressed keys (CK's) at the lowest index level (I=0). Whenever a lowest level block is full, a compressed key entry is generated for the current block in the next higher level, before a further UK-input is provided from the uncompressed-key index. If the entry at the next higher level also fills a block, an entry is generated and placed in the still next higher level, etc., until an entry is made in the highest level which does not complete a block. Accordingly at some UK in the input stream, a series of CK-entries may be cascaded up the levels (1 CK per level), until a level not having a full block is reached; then the next UK is inputted for generating an entry in the next block at lowest index level, etc.

The highest (apex) level generated for a compressed index is the level above which no CK entries have been generated.

In this invention, the terminology "block" and "record" mean the same thing. The blocks in the embodiments can be either physically separated, or they can be different logical blocks in the same physical block.

This invention distinguishes between the generation of the lowest level of a multilevel index, and the generation of its levels higher than the lowest. A level is designated as a value for I. The term "low level" will hereafter refer to the lowest level of the multilevel index for which $I=0$; and the term "high level" will hereafter refer to any level above the "low level." Hence any high level has $I$ greater than 0, and all high levels may be referred to as $I \neq 0$.

With this invention, high-level index blocks have the same format as low-level index blocks, with either the FLK format or LFK-format being used at all levels. The high-level LK-component in the format must sometimes include noise bytes to assure the necessary discrimination among blocks at the next lower-level; while the LK component in the low-level format need not have noise bytes although it optionally may have noise bytes if desired at the expense of reduced compression.

Commonly used terms in this specification have their definitions consolidated in the following DEFINITION TABLE. A SYMBOL TABLE follows to consolidate commonly used symbols found in the specification. A SYMBOL LEGEND FOR FIGS. 5A–E is also provided later in this specification. Many items in the SYMBOL TABLE and SYMBOL LEGEND are further defined in the DEFINITION TABLE.

DEFINITION TABLE

BLOCK: A collection of recorded information which is machine-accessible as a unit. A block is also called a record. The meaning of block and record ordinarily found in the computer arts is applicable.

BOUNDARY UK's: The pair of UK's which contribute to the last CK in a compressed index block in the lowest index level. The second UK of any boundary pair is also used in generating the first CK of the next block at the lowest level. The second UK is also the last UK contributing to a lowest-level compressed index block.

COMPRESSED INDEX: An index of keys which are compressed by the method described in this application.

COMPRESSED INDEX BLOCK: An index block comprising compressed index entries. It is also called a COMPRESSED BLOCK.

COMPRESSED INDEX ENTRY: An index entry having a compressed key and a related pointer.

COMPRESSED KEY: A reduced form of a key which in most situations contains a substantially smaller amount of characters, or bits, then the original key it represents. It is generated by any of the methods described in this application. It is generally referenced by its acronym CK. A CK is sometimes referred to by its format, FLK in which F is the factor field, L is the length field, and K is zero or more key byte(s).

COMPRESSED KEY FORMAT; The recorded form of a compressed key symbolically designated as FLK or LFK, representing the recorded sequence of fields within a compressed key. It is generated by any of the methods described in this application, in which each compressed key has zero, one, or more K bytes comprising the K-field. L is a field (which may be a single byte) containing the number of K bytes in the compressed key. F is a factor field (which may be a single byte) related to the number of bytes not appearing on the high-order side of the K-field in the compressed key.

DATA BLOCK: DATA grouped into a single machine-accessible entity. A data block is also called a data-level block.

DATA LEVEL: The collection of data, which may be called a data base, which is retrievable through the index. The data level comprises one or more data blocks.

DUMMY UNCOMPRESSED KEY: A simulated uncompressed key which represents the first key that can exist in a sorted sequence of uncompressed keys. It is the lowest possible key in an ascending sequence of keys, for which it is comprised of the lowest character in the collating sequence; or it is the highest possible key in a descending sequence of keys, for which it is comprised of the highest sequence in the collating sequence. For example, the lowest possible key in an ascending sequence would have at least one null character when the EBCDIC character set is used, in which the null character comprises eight binary zeros, and it may be called a "null UK."

EQUAL BYTES: The number or consecutive high-order bytes in an UK which are equal to corresponding bytes in the prior UK being compared in a sorted sequence while generating a compressed index.

FACTORED BYTE: A byte not found in the K-field of a CK which was on the high-order side of the K-field in the related UK pair from which the CK was generated.

FACTOR FIELD: A field in a compressed key designated by the acronym, F field. It is derived by any of the methods described in this patent application.

FIRST HIGH CK: The compressed key scanned during a search at which are found the ending conditions for the search. The search ending condition is signalled by the first CK during the search indicating any of a number of conditions called first high conditions. The major first high conditions are: (1) the CK-factor field content indicates a more significant byte position than currently indicated by the setting of the equal counter, or (2) the current factor field content is equal to the equal counter setting, and a K-byte of the CK is greater than a corresponding A byte, or (3) a K byte is equal to the last A byte of the search argument.

HIGH LEVEL: Any index level other than the low level. Each entry in a high level has a pointer that addresses an index block. The index level designator I cannot be zero for any high level; I must be a positive integer greater than zero.

HIGHER LEVEL: A relative term used to reference a level higher than another level in the same index.

INDEX: A recorded compilation of keys with associated pointers for locating information in a machine-readable file data set, or data base. The keys and pointers are accessible to and readable by a computer system. The purpose of the index is to aid the retrieval of required data blocks containing the required information.

INDEX BLOCK: A sequence of index entries which are grouped into a single-machine accessible entity.

INDEX ENTRY: An element of an index block having a single pointer. The entry may contain compressed or uncompressed key(s).

KEY: A group of characters, or bits, forming one or more fields in a data block or data item, utilized in the identification or location of the data block or item. The key may be part of the data, by which a data block, record, or file is identified, controlled or sorted. The ordinary meaning for key found in the computer arts is applicable.

KEY BYTE: A character found in the K-field of a compressed key. It is also called a K-byte.

KEY FIELD: A field in a CK having one or more K-bytes. The key field is also called K-field, or key byte field. The K field exists in a CK only when the L field is not zero. The K field usually follows the L and F control fields in a CK recorded in a compressed index.

LAST UK: The last UK contributing to the generation of a compressed key in a lowest-level compressed index block. The last UK's are the only UK's in the input sequence of UK's to be used in generating the high-level index.

LEFT-SHIFT CK: A relationship of a CK to its prior CK. The relationship is found in the sequential UK-comparisons from which the CK and its prior CK are generated. A left-shift CK occurs when its generating UK-comparison found a smaller number of equal bytes than were found in the prior UK-comparison.

LOWER LEVEL: A relative term used to reference a level lower than another level in the same index.

LOWEST LEVEL: All index blocks in the base level of the index in which each entry has a pointer that addresses a data block. The index level designator I is zero for the lowest level. The lowest level is also called the low level of the index.

NOISE BYTE: All bytes in an uncompressed key to the right of a difference byte position (i.e., to the right of the leftmost unequal byte) found during generation of the compressed keys. In a compressed key, the noise bytes are missing. The acronym N is sometimes used to designate a noise byte.

NO-SHIFT CK: A relationship of a CK to its prior CK. The relationship is found in the sequential UK-comparisons from which the CK and its prior CK are generated. A no-shift CK occurs when its generating UK-comparison found the same number of consecutive high-order equal bytes than were found in the prior UK comparison.

POINTER: An address with a compressed-key entry which locates a related data block or data item.

PRIOR: An adjective relating the modified item to the current item of the same type. For example, the prior UK is the UK immediately before the current UK being handled, and the prior UK-byte is the UK-byte immediately before the current UK-byte being handled, etc.

RIGHT-SHIFT CK: A relationship of a CK to its prior CK. The relationship is found in the sequential UK-comparisons from which the CK and its prior CK are generated. A right-shift CK occurs when its generating UK-comparison found a greater number of equal bytes than were found in the prior UK-comparison.

SEARCH ARGUMENT: A known index key, or argument, which maybe a name or designator assigned to a data block or data item. The search argument is used to search an index for a representation of the desired data block or item represented by the search argument. The desired data block is expected to have a field identical to the search argument. The acronym SA is used to represent the search argument; each byte of the search argument is called an A-byte. For example, an employee's name may be the SA used in searching for his record in a company index sequenced by employee names.

UNCOMPRESSED INDEX: An ordinary index of sequenced uncompressed key's.

UNCOMPRESSED KEY: It has the ordinary meaning for key understood in the data-processing arts. It is generally referred to by its acronym UK. (The reasons for adding the description "uncompressed" in this specification is to distinguish the ordinary key from a reduced form, which is called herein by the term, compressed key.)

UNCOMPRESSED KEY PAIR: A pair of adjacent uncompressed keys in a sorted sequence of keys which are used to generate a compressed key. It is also called a UK-pair.

UNEQUAL BYTE POSITION: The position of the highest-order unequal byte in an uncompressed key determined by a comparison between it and the prior uncompressed key in a sorted sequence of keys while generating the compressed keys. It is also called the difference position or D-byte position. It is the leftmost unequal byte, and the first unequal byte after all consecutive high-order equal bytes in the comparison of a UK-pair. In many cases it is the rightmost K-byte in the compressed key derived from the comparison.

SYMBOL TABLE

B: Byte of a UK.

CK: Compressed key. A subscript on CK particularizes it.

CK's: Plural for CK.

$CK_i$: The current CK being examined while searching a sequence of CK's.

$CK(B_1)$: A compressed key generated from the uncompressed key $B_1$ which is the last UK of the pair of UK's from which this CK is generated.

CIB: Compressed Index Block.

CLK: Clock cycle.

CNT: Count. It usually refers to a byte count.

$i$: A subscript on an item which particularizes the item as being the current item being examined during the process.

$i-1$: A subscript on an item which particularizes the item as being the prior item examined during the processing sequence.

$i+1$: A subscript on an item which particularizes the item as being the next item to be examined during the processing sequence.

I: A level designator in the index beginning with zero for the lowest level.

D: Unequal byte position. Also difference byte position.

E: Number of equal bytes in a UK-comparison. A subscript particularized E.

$E_A$: Number of equal bytes in the UK-comparison immediately prior to the current UK-comparison during multilevel CIB generation.

$E_B$: Number of equal bytes in the current UK comparison during the process.

EOB: End of block.

EOI: End of index.

F: The factor field in a CK having a value indicating the number of high-order UK-bytes missing from the CK.

FLK: Another format for a compressed key in which the sequence of the F and L fields is reversed from the LKF-format.

K-BYTE: Key byte. (A subscript on K further particularizes it.)

K-FIELD: The field in a CK having one or more K-bytes.

LFK: A compressed key format which has the sequence of L-field, F-field, and zero, one, or more K-bytes comprising a K field.

N: A noise byte representation in an uncompressed key. (Noise bytes are not needed for compressed index searching). A subscript on N particularizes it to the UK identified by the subscript.

L: A field in a CK having a value indicating the number of key bytes in a CK. Also the value of the current L field in a register after decrementing the value to determine when the end of each CK is reached during the scan of an index. A subscript of L further particularizes it.

$L_A$: The L field for the last generated CK.

$L_B$: The L field for the CK currently being generated.

PTR: Pointer, which also is represented by the symbol, R.

R: Pointer. It comprises one or more bytes representing an address of a data block related to the compressed key with which the pointer is associated.

S: Shift indicator. The current CK being generated is a right-shift CK if L is positive, a no-shift CK if L is zero, or a left-shift CK if L is negative.

UK: Uncompressed key. (A subscript on UK further particularizes it.)

UK's: Plural for UK.

UK $B_1$: UK with subscript $B_1$.

$Y_0$: The UK stored for index level 0 generation, i.e., prior UK read from input stream for lowest level generation.

$Y_I$: The UK stored for any index level I; it is selectively transferred from the level 0 store.

The foregoing and other objects, features and advantages of the invention will be apparent from the following more particular description of preferred embodiments of the invention, as illustrated in the accompanying drawings.

DESCRIPTION OF DRAWINGS

FIG. 4 illustrates an overview of a general purpose or special purpose computer system which may contain the invention;

FIG. 4C illustrates a particular dynamic storage structure with the particular level registers used in the method illustrated in FIGS. 5A–E;

MULTILEVEL INDEX-STRUCTURING

Figure 1:
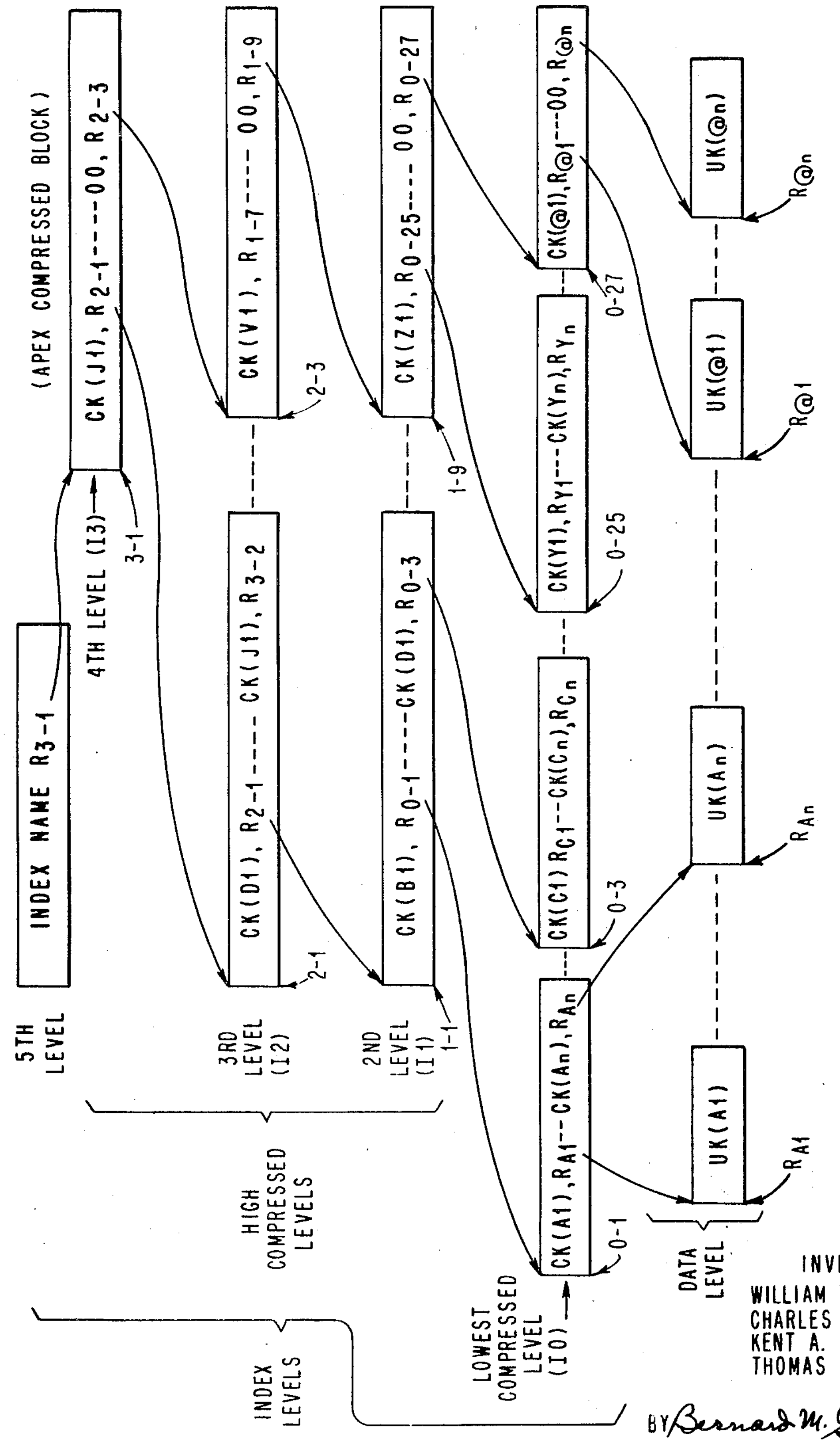
FIG. 1 represents a multilevel compressed index block structure generated according to this invention.
Figure 2A:
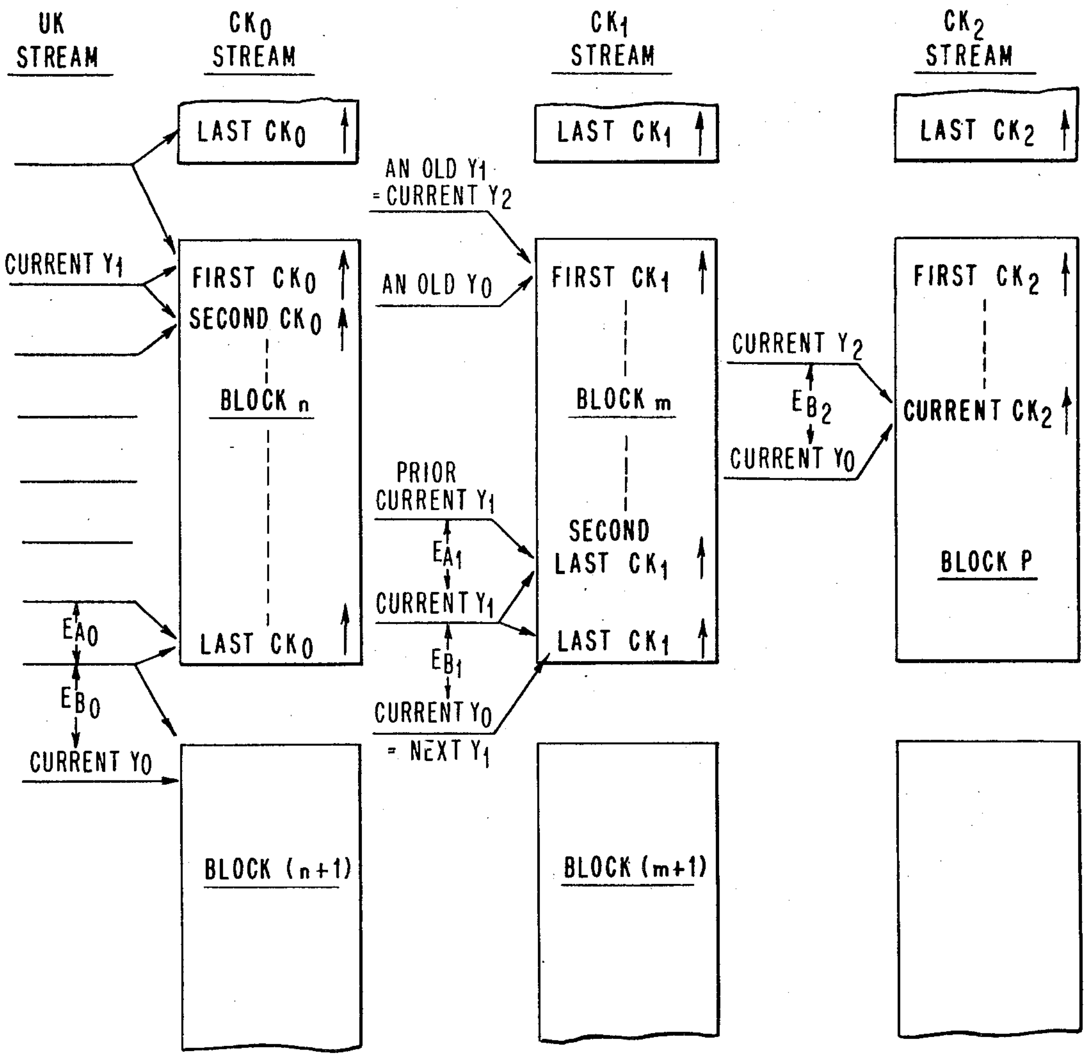
FIG. 2A generally illustrates the inputting of sorted Uncompressed Keys (UK's) and the concurrent generating therefrom of the Compressed Keys (CK's) in all levels in the multilevel index structure.
Figure 2B:
FIGS. 2B and C illustrate compressed key formats, either of which can be used for all levels of a multilevel index structure generated by this invention.
Figure 2C:
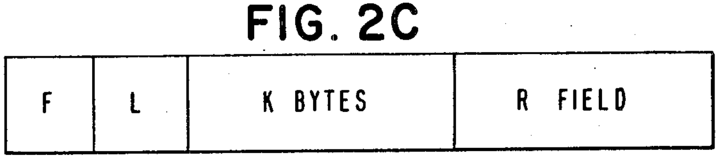

The result of the invention is represented in FIG. 1 by compressed index levels 10 through 13. They are used to retrieve information from the data level. The compressed low level index is I0, i.e., $I=0$, and compressed high levels are I1, I2 and I3, i.e., $I \neq 0$. A 5th level is not compressed and may be an entry in a conventional computer system catalogue; the entry may comprise the name of the data base, and an address (pointer) $R_{3-1}$ which locates the level I3 Apex compressed index block 3–1.

The data level comprises a large plurality of blocks of data, each being indexed by an Uncompressed Key (UK), which may or may not be stored in the information blocks represented by key UK($A_1$) through a last block having key UK($@_n$). The choice of the key, if any, for each block is not part of this invention, and it can be the conventional practice of taking any field in a block which is used to index the block. For example, the key may be a field in the block representing an inventory item, man numbers, department number, book, auto license number, etc. Hence the other portions in the block may contain information indexed by the selected key. The blocks at data level may be randomly located where ever there is space on a randomly accessible storage device, such as for example on a magnetic disk drive, a magnetic drum, or strip file device. There is no requirement that any of the blocks in multilevel index or data have any rigid positional relationship, sequential or otherwise. Each may be located at any place where space is available on a device, as long as the block address for the available space is provided as an input to this invention for storage of index blocks being generated. The primary requirement for fast retrieval is that the device and block be quickly accessible.

The data blocks in FIG. 1 are shown in order of the sorted sequence of their uncompressed keys, UK ($A_1$) through UK ($@_n$). This sorted representation is included in the organization of the invention's multilevel indexing structure. However this sorted key relationship has no positional relationship to the locations of the data or index blocks on the one or more randomly accessible devices in which the blocks are stored. A desirable consequency of this random-position indexing organization is that it makes unnecessary the moving of an existing block whenever new index blocks are added into the index.

A search for any data block using this indexing structure only requires the accessing of one block per indexing level at computer speed, regardless of the number of blocks at any level. Hence in FIG. 1, any required data block may be directly retrieved as the sixth block access after five indexing block accesses from level 14 downwardly through levels I3, I2, I1, I0 and the data block. The six accesses are not affected by the number of blocks at any of these levels, including the data level.

The beginning of each index block is located at an address, called a pointer R having two subscript numbers. The first subscript represents the level of the addressed block, and the second subscript represents the sorted position of the addressed block in its particular level. The pointers $R_{2-1}$ through $R_{2-3}$ within level I3 locate the respective blocks 2-1 through 2-3 in level I2. Similarly each of pointers $R_{1-1}$ through $R_{1-9}$ in I2 locates a respective block 1-1 through 1-9 in I1. Likewise the respective pointers $R_{0-1}$ through $R_{0-27}$ in I1 locate the respective blocks 0-1 through 0-27 within I0. Finally each pointer $R_{A1}$ through $R_{@n}$ locates a respective block in the data level.

At level 10, each Compressed Key has a pointer appended to it, such as the first CK ($A_1$) having appended pointer $R_{A1}$ for locating the first data-level block; and each block in level I0 is generated by the compressed index method and means disclosed and claimed in (1) U.S. Pat. No. 3,593,309 (application Ser. No. 788,807) filed Jan. 3, 1969 by W. A. Clark IV, K. A. Salmond and T. S. Stafford titled "Method and Means for Generating Compressed Keys," assigned to the same assignee as the subject application.

A very large data base can be handled by the indexing structure in FIG. 1. Accordingly the index can handle a very large number of keys for searching among a corresponding number of blocks at level I0. For example the following TABLES B and C represent a compressed index which will accommodate 27,000 separate data blocks within the data level if each I0 block includes 1,000 compressed keys (CK's), which is a practical number. TABLE A represents the uncompressed index corresponding to the compressed index in TABLES B and C.

In another example, if every index block in levels I0–I3 in FIG. 1 is assumed to have 35 pointers per block the four index levels will index up to 1,500,625 data blocks within the data level. Hence it becomes possible to randomly retrieve any of 1,500,625 data blocks with five machine accesses which can be done in less than 1 second using seven different direct access devices (DASD), each having an average access time of less than 200 milliseconds, which is available with current direct access device technology.

In the special case where every index block has C number of keys, and $j$ number of index levels are used, the maximum number of accommodated data blocks is $C^j$.

Some examples using four index levels ($j$=4) are:

1. Using 100 pointers per block: 1,010,101 index blocks over the four levels can index a maximum of 100,000,000 data blocks.
2. Using 1,000 pointers per block 1,001,001,001 index blocks over the four levels can index a maximum of 1,000,000,000,000 (one trillion) data blocks.

In both examples (1) and (2), five block accesses are required to fetch any data block by starting a search with the highest level block. If CK's are used instead of UK's in each index block, the number of index blocks is reduced when using blocks of the same storage size (byte length), or the storage size (byte length) of the index blocks is reduced when using the same number of index blocks. Thus for one-tenth compression using Ck's, example (1) could either (a) reduce by one-tenth the number of index blocks having the same byte length for a total of 101,011 index blocks, or (b) reduce by one-tenth the byte length for each of the 1,010,101 blocks. A like compression in example (2) could either (a) use the same byte length to reduce the total number of index blocks to 100,100,101 or (b) reduce by one-tenth the byte length of each of the 1,001,001,001 index blocks.

The following Table A illustrates a "Multilevel Uncompressed Index" having four index levels I0–I3 of blocks from which the "Multilevel Compressed Index" in the following Table B is generated. A time relationship is also represented in each of these tables, wherein time increases as the items progress downwardly in the tables, and items horizontally positioned occur within the same time increment.

TABLE A.—MULTILEVEL UK OPERATION

TIME ↓

| I0 | | | I1 | | | I2 | | | I3 | | |
|---|---|---|---|---|---|---|---|---|---|---|---|
| BL | UKs | PTRs | BL | UKs | PTRs | BL | UKs | PTRs | BL | UKs | PTRs |
| 0-1 | $A_1$ | $R_{A1}$ | | | | | | | | | |
| | $A_n$ | $R_{An}$ | 1-1 | $B_1$ | $R_{0-1}$ | | | | | | |
| 0-2 | $B_1$ | $R_{B1}$ | | | | | | | | | |
| | $B_n$ | $R_{Bn}$ | | $C_1$ | $R_{0-2}$ | | | | | | |
| 0-3 | $C_1$ | $R_{C1}$ | | | | | | | | | |
| | $C_n$ | $R_{Cn}$ | | $D_1$ | $R_{0-3}$ | 2-1 | $D_1$ | $R_{1-1}$ | | | |
| 0-4 | $D_1$ | $R_{D1}$ | | | | | | | | | |
| | $D_n$ | $R_{Dn}$ | 1-2 | $E_1$ | $R_{0-4}$ | | | | | | |
| 0-5 | $E_1$ | $R_{E1}$ | | | | | | | | | |
| | $E_n$ | $R_{En}$ | | $F_1$ | $R_{0-5}$ | | | | | | |
| 0-6 | $F_1$ | $R_{F1}$ | | | | | | | | | |
| | $F_n$ | $R_{Fn}$ | | $G_1$ | $R_{0-6}$ | | | | | | |
| 0-7 | $G_1$ | $R_{G1}$ | | | | | | | | | |
| | $G_n$ | $R_{Gn}$ | 1-3 | H | $R_{0-7}$ | | | | | | |
| 0-8 | $H_1$ | $R_{H1}$ | | | | | | | | | |
| | $H_n$ | $R_{Hn}$ | | $I_1$ | $R_{0-8}$ | | | | | | |
| 0-9 | $I_1$ | $R_{I-1}$ | | | | | | | | | |
| | $I_n$ | $R_{In}$ | | $J_1$ | $R_{0-9}$ | | $J_1$ | $R_{1-3}$ | 3-1 | $J_1$ | $R_{2-1}$ |
| 0-10 | $J_1$ | $R_{J1}$ | | | | | | | | | |
| | $J_n$ | $R_{Jn}$ | 1-4 | $K_1$ | $R_{0-10}$ | | | | | | |
| 0-11 | $K_1$ | $R_{K1}$ | | | | | | | | | |
| | $K_n$ | $R_{Kn}$ | | $L_1$ | $R_{0-11}$ | | | | | | |
| 0-12 | $L_1$ | $R_{L1}$ | | | | | | | | | |
| | $L_n$ | $R_{Ln}$ | | $M_1$ | $R_{0-12}$ | 2-2 | $M_1$ | $R_{1-4}$ | | | |
| 0-13 | $M_1$ | $R_{M1}$ | | | | | | | | | |
| | $M_n$ | $R_{Mn}$ | 1-5 | $N_1$ | $R_{0-13}$ | | | | | | |
| 0-14 | $N_1$ | $R_{N1}$ | | | | | | | | | |
| | $N_n$ | $R_{Nn}$ | | $O_1$ | $R_{0-14}$ | | | | | | |
| 0-15 | $O_1$ | $R_{O1}$ | | | | | | | | | |
| | $O_n$ | $R_{On}$ | | $P_1$ | $R_{0-15}$ | | $P_1$ | $R_{1-5}$ | | | |
| 0-16 | $P_1$ | $R_{P1}$ | | | | | | | | | |
| | $P_n$ | $R_{Pn}$ | 1-6 | $O_1$ | $R_{0-16}$ | | | | | | |
| 0-17 | Q | $R_{Q1}$ | | | | | | | | | |
| | $Q_n$ | $R_{Qn}$ | | $R_1$ | $R_{0-17}$ | | | | | | |
| 0-18 | $R_1$ | $R_{R1}$ | | | | | | | | | |
| | $R_n$ | $R_{Rn}$ | | $S_1$ | $R_{0-18}$ | | $S_1$ | $R_{1-6}$ | | $S_1$ | $R_{2-2}$ |

Table A—Continued

| I0 | | | I1 | | | I2 | | | I3 | | |
|---|---|---|---|---|---|---|---|---|---|---|---|
| BL | UKs | PTRs | BL | UKs | PTRs | BL | UKs | PTRs | BL | UKs | PTRs |
| 0-19 | $S_1$ | $R_{S1}$ | | | | | | | | | |
| | $S_n$ | $R_{Sn}$ | | $T_1$ | $R_{0-19}$ | | | | | | |
| 0-20 | $T_1$ | $R_{T1}$ | | | | | | | | | |
| | $T_n$ | $R_{Tn}$ | | $U_1$ | $R_{0-20}$ | | | | | | |
| 0-21 | $U_1$ | $R_{U1}$ | | | | | | | | | |
| | $U_n$ | $R_{Un}$ | | $V_1$ | $R_{0-21}$ | 2-3 | $V_1$ | $R_{1-7}$ | | | |
| 0-22 | $V_1$ | $R_{V1}$ | | | | | | | | | |
| | $V_n$ | $R_{Vn}$ | 1-8 | $W_1$ | $R_{0-22}$ | | | | | | |
| 0-23 | $W_1$ | $R_{W1}$ | | | | | | | | | |
| | $W_n$ | $R_{Wn}$ | | $X_1$ | $R_{0-23}$ | | | | | | |
| 0-24 | $X_1$ | $R_{X1}$ | | | | | | | | | |
| | $X_n$ | $R_{Xn}$ | | $Y_1$ | $R_{0-24}$ | | $Y_1$ | $R_{1-8}$ | | | |
| 0-25 | $Y_1$ | $R_{Y1}$ | | | | | | | | | |
| | $Y_n$ | $R_{Yn}$ | 1-9 | $Z_1$ | $R_{0-25}$ | | | | | | |
| 0-26 | $Z_1$ | $R_{Z1}$ | | | | | | | | | |
| | $Z_n$ | $R_{Zn}$ | | $@_1$ | $R_{0-26}$ | | | | | | |
| 0-27 | $@_1$ | $R@_1$ | | | | | | | | | |
| | $@_n$ | $R@_n$ | | END | $R_{0-27}$ | | END | $R_{1-9}$ | | END | $R_{2-3}$ |
| | END of I0 Index | | | END of I1 Index | | | END of I2 Index | | | END of I3 Index | |

TABLE B.—MULTILEVEL COMPRESSED INDEX

| I0 | | | I1 | | | I2 | | | I3 | | |
|---|---|---|---|---|---|---|---|---|---|---|---|
| BL | CK | PTR | BL | CK | PTR | BL | CK | PTR | BL | CK | PTR |
| 0-1 | CK($A_1$) | $R_{A1}$ | | | | | | | | | |
| | CK($A_m$) | $R_{An}$ | 1-1 | CK($B_1$) | $R_{0-1}$ | | | | | | |
| 0-2 | CK($B_1$) | $R_{B1}$ | | | | | | | | | |
| | CK($B_m$) | $R_{Bn}$ | | CK($C_1$) | $R_{0-2}$ | | | | | | |
| 0-3 | CK($C_1$) | $R_{C1}$ | | | | | | | | | |
| | CK($C_m$) | $R_{Cn}$ | | CK($D_1$) | $R_{0-3}$ | 2-1 | CK($D_1$) | $R_{1-1}$ | | | |
| | | | | | | | CK($G_1$) | $R_{1-2}$ | | | |
| | | | | | | | CK($J_1$) | $R_{1-3}$ | 3-1 | CK($J_1$) | $R_{2-1}$ |
| | | | | | | | | | | CK($S_1$) | $R_{2-2}$ |
| | | | | | | 2-3 | CK($V_1$) | $R_{1-7}$ | | | |
| | | | | | | | CK($Y_1$) | $R_{1-8}$ | | | |
| 0-25 | CK($Y_1$) | $R_{Y1}$ | | | | | | | | | |
| | CK($Y_m$) | $R_{Yn}$ | 1-9 | CK($Z_1$) | $R_{0-25}$ | | | | | | |
| 0-26 | CK($Z_1$) | $R_{Z1}$ | | | | | | | | | |
| | CK($Z_m$) | $R_{Zn}$ | | CK($@_1$) | $R_{0-26}$ | | | | | | |
| 0-27 | CK($@_1$) | $R@_1$ | | | | | | | | | |
| | 00 | $R@_n$ | | 00 | $R_{0-27}$ | | 00 | $R_{1-9}$ | | 00 | $R_{2-3}$ |

TABLE A, column I0, illustrates the lowest index level I0 blocks of Uncompressed Keys (UK's) obtained from the key fields of the information blocks at data level. The data-level information blocks need not be located in any particular order, and are assumed to have random locations. After the data block keys are obtained, they are sorted to generate the I0 UK-sequence, such as in column I0, by programming or hardware means which does sorting and is not part of this invention. Hence the UK's are in sorted sequence in column I0 in Table A, and they are sorted in a form which can provide the input to this invention. For example, they may be sorted on a tape I/0 device in a sequential manner.

The input UK's represented in column I0 in Table A are shown in groups 0–1 through column 0–27 in column I0 of Table A, but this grouping does not exist on this input I/0 device. Rather, this grouping is representative of the UK's which will later be found to contribute to a particular Compressed Index Block (CIB) at index level I0. Hence the future Compressed Index Block numbers (BL) are associated with the illustrated UK groupings.

At levels above I0 in Table A, UK's are shown which contribute to generation of compressed keys at the higher levels in which the respective UK's are positioned at the respective time of their use.

The time of generation of a respective CK block boundary is associated with the handling of a particular UK at a respective level; this CIB completion time is represented in the TABLE A And B by a dashed line following the last handled UK required for completing the CIB. The boundary at the end of each block in column I0 is represented by dashed lines and some dashed lines have one or more intersecting slash lines, /, to represent the significance of that boundary for higher levels. Thus each boundary identified by symbol ----/---- is also significant to completion of a CIB at I1; each symbol -----//--- is also significant to completion of CIB's at I1 and I2; and each symbol --///---- is also significant to the completion of CIB's at I1, I2 and I3. Table B is abbreviated to save space but its CK's have the same multilevel time relationship that is represented in Table A for corresponding UK's which have the same pointer R.

The size of each block in practice may be predetermined by the user of the invention, and it will be dependent upon the type of storage that is available for the multilevel index, and the required speed of search. The size of a compressed block is directly related to the speed of search, since any single block is searched sequentially from its beginning, even though it may not be searched all the way to its end. Hence the shorter the block, the less is the average search time through a block. It is seldom necessary to search to the end of any given block, since the search ends as soon as the search argument is low with respect to any compressed key in a block. A good rule of thumb for determining average search time per block is the time required to scan one-half a block. The search technique may use the method and means described and claimed in the previously cited application having Ser. No. 788,835 (PO-9-68-058).

The number of blocks entered by a search argument is equal to the number of levels in the multilevel index. Thus the search speed is independent of the number of blocks in any given level. Other factors in determining the practical size of the multilevel blocks is the efficiency in utilization of storage space on particular I/0 devices in which blocks may be stored, and their access time thereon.

Although equal-size blocks are shown for all high levels in Table A, this is a special case. The block size in number of compressed keys per block may be represented by $C_0$, $C_1$, ......$C_j$ at respective levels 0, *1*,.....*j*, where *j* is the highest level. C represents the number of pointers in a high-level index block, where high-level is level 1 or higher. C also is the number of next-lower-level blocks indexed by this same block. For example $C_1$ represents the number of pointers in an I1 block.

$K_0$, $K_1$,...,$K_j$ represent the number of blocks at the respective subscript index levels; and $K_j$=1. The number K of blocks decreases exponentially from $K_0$ to $K_j$ as the level number increases. Hence the total number of blocks in an index is $K_1+K_2+.....+K_j$.

Only one CK per pointer is used at any index level; hence the number of blocks at any level is equal to the number of pointers in the next higher level, for example $K_0=K_1\times C_1$. In the special case where the number of pointers per block RB is equal for all index levels, and $K_j=1$, then $RB=K_0/K_1=K_1/K_2=...=K_{j-1}$. This special case is represented in Tables A and B, The total number of data blocks handled by this special case is $Rb^j$.

Table B shows the four levels of the "Multilevel Compressed Index" which is derived from the "Multilevel Uncompressed Index" represented in column I0 of Table A. Table B has the same number of CK entries as there are UK's in Table A, but it is apparent that the space occupied by the entries in Table B is much smaller because of the unique index compression.

LOW-LEVEL COMPRESSED-KEY STRUCTURING

Table C represents a general sequence of UK's in the input stream similar to those shown in FIG. 9 in U.S. Pat. No. 3,593,309 (previously cited), except fro block-delineation lines after every fifth key number, which indicates five UK's are used to generate each block at I/0.

TABLE C

| Key No. | UK field 1 | 2 | 3 | 4 | 5 | 6 | 7 | 8 | 9 | 10 | 11 | 12 | 13 | 14 | $F_N$ | $F_X$ | L | Pointer field 1 | 2 | 3 | 4 | 5 | 6 |
|---|---|---|---|---|---|---|---|---|---|---|---|---|---|---|---|---|---|---|---|---|---|---|---|
| 0 | B | B | B | B | B | B | B | B | B | B | B | B | B | B | 0 | 0 | 5 | R | R | R | R | R | R |
| 1 | B | B | B | B | D | B | B | B | B | B | B | B | B | B | 5 | 5 | 2 | R | R | R | R | R | R |
| 2 | B | B | B | B | B | B | D | B | B | B | B | B | B | B | 7 | 7 | 3 | R | R | R | R | R | R |
| 3 | B | B | B | B | B | B | B | B | B | D | B | B | B | B | 10 | 10 | 2 | R | R | R | R | R | R |
| 4 | B | B | B | B | B | B | B | B | B | B | B | D | B | B | 12 | 12 | 1 | R | R | R | R | R | R |
| 5 | B | B | B | B | B | B | B | B | B | B | B | B | D | B | 10 | 13 | 0 | R | R | R | R | R | R |
| 6 | B | B | B | B | B | B | B | B | B | D | B | B | B | B | 8 | 10 | 0 | R | R | R | R | R | R |
| 7 | B | B | B | B | B | B | B | D | B | B | B | B | B | B | 7 | 8 | 0 | R | R | R | R | R | R |
| 8 | B | B | B | B | B | B | D | B | B | B | B | B | B | B | 3 | 7 | 0 | R | R | R | R | R | R |
| 9 | B | B | D | B | B | B | B | B | B | B | B | B | B | B | 2 | 2 | 1 | R | R | R | R | R | R |
| 10 | B | B | D | B | B | B | B | B | B | B | B | B | B | B | 3 | 3 | 0 | R | R | R | R | R | R |
| 11 | B | B | D | B | B | B | B | B | B | B | B | B | B | B | 2 | 2 | 1 | R | R | R | R | R | R |
| 12 | B | B | D | B | B | B | B | B | B | B | B | B | B | B | 3 | 3 | 0 | R | R | R | R | R | R |
| 13 | B | B | D | B | B | B | B | B | B | B | B | B | B | B | 2 | 2 | 1 | R | R | R | R | R | R |
| 14 | B | B | D | B | B | B | B | B | B | B | B | B | B | B | 3 | 3 | 4 | R | R | R | R | R | R |
| 15 | B | B | B | B | B | B | D | B | B | B | B | B | B | B | 5 | 7 | 0 | R | R | R | R | R | R |
| 16 | B | B | B | B | D | B | B | B | B | B | B | B | B | B | 4 | 4 | 5 | R | R | R | R | R | R |
| 17 | B | B | B | B | B | B | B | B | D | B | B | B | B | B | 6 | 9 | 0 | R | R | R | R | R | R |
| 18 | B | B | B | B | B | D | B | B | B | B | B | B | B | B | 5 | 5 | 1 | R | R | R | R | R | R |
| 19 | B | B | B | B | B | D | B | B | B | B | B | B | B | B | 6 | 6 | 0 | R | R | R | R | R | R |
| 20 | B | B | B | B | B | D | B | B | B | B | B | B | B | B | 5 | 5 | 5 | R | R | R | R | R | R |

TABLE C

| Key No. | UK field 1 | 2 | 3 | 4 | 5 | 6 | 7 | 8 | 9 | 10 | 11 | 12 | 13 | 14 | Pointer field $F_N$ | $F_X$ | L | 1 | 2 | 3 | 4 | 5 | 6 |
|---|---|---|---|---|---|---|---|---|---|---|---|---|---|---|---|---|---|---|---|---|---|---|---|
| 21 | B | B | B | B | B | B | B | B | B | D | B | B | B | B | 10 | 10 | 2 | R | R | R | R | R | R |
| 22 | B | B | B | B | B | B | B | B | B | B | B | D | B | B | 12 | 12 | 0 | R | R | R | R | R | R |
| 23 | B | B | B | B | B | B | B | B | B | B | B | D | B | B | 11 | 11 | 1 | R | R | R | R | R | R |
| 24 | B | B | B | B | B | B | B | B | B | B | B | D | B | B | 9 | 12 | 0 | R | R | R | R | R | R |
| 25 | B | B | B | B | B | B | B | B | D | B | B | B | B | B | 7 | 9 | 0 | R | R | R | R | R | R |
| 26 | B | B | B | B | B | B | D | B | B | B | B | B | B | B | 5 | 7 | 0 | R | R | R | R | R | R |
| 27 | B | B | B | B | D | B | B | B | B | B | B | B | B | B | 4 | 4 | 1 | R | R | R | R | R | R |
| 28 | B | B | B | B | D | B | B | B | B | B | B | B | B | B | 5 | 5 | 0 | R | R | R | R | R | R |
| 29 | B | B | B | B | D | B | B | B | B | B | B | B | B | B | 3 | 5 | 0 | R | R | R | R | R | R |
| 30 | B | B | D | B | B | B | B | B | B | B | B | B | B | B | 1 | 3 | 0 | R | R | R | R | R | R |
| 31 | D | B | B | B | B | B | B | B | B | B | B | B | B | B | 0 | 0 | 1 | R | R | R | R | R | R |
| 32 | D | B | B | B | B | B | B | B | B | B | B | B | B | B | 1 | 1 | 9 | R | R | R | R | R | R |
| 33 | B | B | B | B | B | B | B | B | B | D | B | B | B | B | 10 | 10 | 1 | R | R | R | R | R | R |
| 34 | B | B | B | B | B | B | B | B | B | B | D | B | B | B | 11 | 11 | 0 | R | R | R | R | R | R |
| 35 | B | B | B | B | B | B | B | B | B | B | D | B | B | B | 5 | 11 | 0 | R | R | R | R | R | R |
| 36 | B | B | B | B | D | B | B | B | B | B | B | B | B | B | 4 | 4 | 1 | R | R | R | R | R | R |
| 37 | B | B | B | B | D | B | B | B | B | B | B | B | B | B | 0 | 0 | 0 | R | R | R | R | R | R |

Legend for Table C

B or D=Byte position in a UK.
D=Difference byte position at I0, and demarked by ________________
$F_N$=Minimum factor byte number field at I0, and demarked by - - - - - - - - - - - -
$F_X$=Maximum factor byte number field at I0.
$F_I$=Factor field at I1, and demarked by - - - - - - - - - - - - - - - -
L=Number of key bytes from UK for a related CK at I0.
R=Input stream pointer byte position.

The corresponding F and L values at I0 for the CK's generated from the illustrated UK's are shown in Table C followed by a representation of the associated pointer RRRRR. The graphic lines in the table give a dynamic view of what happens during the generation of CK's from a sequence of UK's. It is noted in Table C that a total of 48 K-bytes represent the 37 UK's illustrated with a total of 518 key bytes. Accordingly Table C illustrates a key compression of less than one-tenth of the number of UK-bytes. With one byte added to each CK to represent the F and L-values, the compression for the CK's in Table C is about one-seventh of the Uncompressed Key bytes. In practice with large indexes, the compression has been found to average less than one K-byte per key level I0.

Table C shows how the difference-byte position D can vary widely in any sorted sequence, wherein it can right-shift, no-shift, and left-shift (as represented by the steps in the solid line) in a random distribution, fixed only in a particular data set. Each position D also represents its corresponding $E_{B_0}$, the latter being the number of bytes to the left of position D.

HIGH-LEVEL COMPRESSED-KEY STRUCTURING

This invention creates the next higher level compressed index by using the value of $E_{B_0}$ determined by boundary UK's at I0. The boundary UK's are the pair of UK's which contribute to the last CK in a compressed block at I0, except the last block. The second UK of any boundary pair also is used in generating the first CK of the next block. Table C provides a horizontal line between Key Numbers of each two UK's comprising a boundary horizontal line in the right side, of Table C. The most significant UK of a boundary pair is its second UK; and these UK's are shown in Table D with the key numbers 5, 10, 15, 20, 25, 30 and 35, which are the same as the UK's shown in Table C having the same key number.

TABLE D.—(I=1)

| Key NO. | UK Field 1 | 2 | 3 | 4 | 5 | 6 | 7 | 8 | 9 | 10 | 11 | 12 | 13 | 14 | S | $E_{B_1}$ | $E_{A_1}$ | $E_{B_0}$ | L | F |
|---|---|---|---|---|---|---|---|---|---|---|---|---|---|---|---|---|---|---|---|---|
| 5 | X | B | B | B | B | B | B | B | B | B | B | B | D | B | 0 | 0 | 0 | 12 | 13 | 0 |
| 10 | B | B | B | B | B | B | B | B | B | B | B | B | B | B | + | 2 | 0 | 2 | 2 | 1 |
| 15 | B | B | X | B | B | B | D | B | B | B | B | B | B | B | 0 | 2 | 2 | 6 | 5 | 2 |
| 20 | B | B | B | B | X | D | B | B | B | B | B | B | B | B | + | 4 | 2 | 5 | 3 | 3 |
| 25 | B | B | B | B | B | B | B | B | B | B | B | B | B | B | + | 8 | 4 | 8 | 4 | 5 |
| 30 | B | B | B | B | B | B | B | B | B | B | B | B | B | B | − | 2 | 8 | 2 | 1 | 2 |
| 35 | X | B | B | B | B | B | B | B | B | B | D | B | B | B | − | 0 | 2 | 10 | 11 | 0 |

TABLE E1.—(I≠0)

| Key NO. | UK Field 1 | 2 | 3 | 4 | 5 | 6 | 7 | 8 | 9 | 10 | 11 | 12 | 13 | 14 | S | $E_{B_I}$ | $E_{A_I}$ | $E_{B_O}$ | L | F |
|---|---|---|---|---|---|---|---|---|---|---|---|---|---|---|---|---|---|---|---|---|
| 1 | X | B | B | D | B | B | B | B | B | B | B | B | B | B | 0 | 0 | 0 | 3 | 4 | 0 |
| 2 | B | B | X | B | B | B | B | D | B | B | B | B | B | B | + | 2 | 0 | 7 | 7 | 1 |
| 3 | B | B | B | X | B | B | B | B | B | B | B | B | D | B | + | 3 | 2 | 12 | 10 | 3 |
| 4 | B | B | B | B | B | B | X | B | B | B | B | D | B | B | + | 6 | 3 | 11 | 8 | 4 |
| 5 | B | B | B | B | B | B | B | B | B | B | Ð | B | B | B | + | 10 | 6 | 10 | 4 | 7 |
| 6 | B | B | B | B | B | B | B | B | B | B | B | Ð | B | B | + | 11 | 10 | 11 | 1 | 11 |
| 7 | B | B | B | B | B | B | B | B | B | B | B | B | B | Ð | + | 13 | 11 | 13 | 2 | 12 |

TABLE E2.—(I≠0)

| Key NO. | UK Field 1 | 2 | 3 | 4 | 5 | 6 | 7 | 8 | 9 | 10 | 11 | 12 | 13 | 14 | S | $E_{B_I}$ | $E_{A_I}$ | $E_{B_O}$ | L | F |
|---|---|---|---|---|---|---|---|---|---|---|---|---|---|---|---|---|---|---|---|---|
| 1 | X | B | B | B | B | B | B | D | B | B | B | B | B | B | 0 | 0 | 0 | 7 | 8 | 0 |
| 2 | B | B | B | B | B | B | B | B | B | B | B | B | B | D | + | 13 | 0 | 13 | 13 | 1 |
| 3 | B | B | B | B | B | B | B | B | B | B | B | B | Ð | B | − | 12 | 13 | 12 | 1 | 12 |
| 4 | B | B | B | B | B | B | B | B | B | B | X | Ð | B | B | − | 10 | 11 | 11 | 2 | 10 |
| 5 | B | B | B | B | B | B | B | X | B | B | B | D | B | B | − | 7 | 10 | 11 | 5 | 7 |
| 6 | B | B | B | X | B | B | B | B | B | B | B | B | D | B | − | 3 | 7 | 12 | 10 | 3 |
| 7 | B | X | B | B | B | B | B | B | B | B | B | B | B | D | − | 1 | 3 | 13 | 13 | 1 |

TABLE E3.—(I≠0)

| Key NO. | UK Field 1 | 2 | 3 | 4 | 5 | 6 | 7 | 8 | 9 | 10 | 11 | 12 | 13 | 14 | S | $E_{B_I}$ | $E_{A_I}$ | $E_{B_O}$ | L | F |
|---|---|---|---|---|---|---|---|---|---|---|---|---|---|---|---|---|---|---|---|---|
| 1 | X | B | B | B | B | D | B | B | B | B | B | B | B | B | 0 | 0 | 0 | 5 | 6 | 0 |
| 2 | B | B | B | B | B | B | B | B | B | Ð | B | B | B | B | + | 9 | 0 | 9 | 9 | 1 |
| 3 | B | B | B | B | B | B | B | B | B | Ð | B | B | B | B | 0 | 9 | 9 | 9 | 1 | 9 |
| 4 | B | B | B | B | B | B | B | B | B | Ð | B | B | B | B | 0 | 9 | 9 | 9 | 1 | 9 |
| 5 | B | B | B | B | B | B | B | B | B | X | B | D | B | B | 0 | 9 | 9 | 11 | 3 | 9 |
| 6 | B | B | B | B | B | B | B | B | B | X | B | B | B | D | 0 | 9 | 9 | 13 | 5 | 9 |
| 7 | B | B | B | B | B | B | B | B | B | X | D | B | B | B | 0 | 9 | 9 | 10 | 2 | 9 |

Legend for Tables D and E

B, D, or X=Byte position in UK.
D=Highest-order difference byte position in low level (I=0).
X=Highest-order difference byte in high level (I≠0).
Ð=Same position for difference bytes in two consecutive levels.
Key bytes used in related CK are underlined.
The following graphic lines have the meaning indicated:
$E_{B_I}$ —— — —— — —— — —— — ——.
$E_{A_I}$ ----------------------------------------.
F —— — —— — —— — —— — ——.
$E_{B_0}$ ————————————————.

The low-level difference bytes, D, shown in Table D, are the same D-bytes found in these UK's in Table C; and accordingly the difference bytes D in Table D may be called the lowest level boundary difference bytes.

The invention embodiment operates on the UK's in Table D to identify their highest-order difference bytes, X, at the higher level (*I*=1) in a manner similar to that used in Table C to identify its highest-order difference bytes, D, at the lower level (*I*=a). Thus the high-level difference bytes, X, are identified by comparison of adjacent pairs of UK's in Table D, while determining the number $E_{B_I}$ of consecutive equal byte positions to the left of each difference byte X.

A unique property discovered herein and used in this invention is that the difference bytes X determined in this manner for a high level always occurs at an equal order or higher order byte position than the difference byte D in the same UK determined at a lower level, i.e., $E_{B_I} \leq E_{B_0}$. This property is due to the fact that as a respective pair of UK's is selected further and further apart in a sorted sequence (which occurs as the level increases), their number of high-order equal bytes $E_{B_I}$ is equal to the smallest value of $E_{B_0}$ found for all UK's between the respective pair. This smallest $E_{B_0}$ often will not be the $E_{B_0}$ generated with the second key in the respective pair that determines its D-byte position, in which case the $E_{B_I}$ value at the higher level is smaller than the second UK's $E_{B_0}$ value. This property can be expressed as: $E_{B_I} \leq E_{B_0}$ where $I > 0$.

At high levels ($I \neq 0$), as shown in Table D, the UK's may be classified into the three types previously referenced in the generatioh of the low-level; i.e., right-shift type, left-shift type, and no-shift type. However, the same UK may be a different type at a high level than its type at low level. The type at a high level is dependent upon which way the UK-difference byte, X, is positioned relative to the difference byte X in the adjacent preceding UK for the same level. Thus in Table D, key number 20 is a right-shift type because its X-byte is to the right of the X-byte in the preceding key number 15. However, key number 20 is a no-shift-type UK at low level in Table C because its D-byte is at the same position as the D-byte in the prior UK (number 19). Key number 35 is a left-shift type in Table D because its byte X is to the left of byte X in its prior key number 30, but key number 35 is a right-shift type in Table C.

The key may be determined by the sign of the difference $E_{B_I}$ minus $E_{A_I}$. Thus S is zero for no-shift-type keys, minus for the left-shift-type keys, and plus for right-shift-type keys. For the purpose of the described embodiment, the three-key types are classified into two classes. One class comprises the no-shift and left-shift-type keys, for which S is equal to or less than zero; while the other class comprises right-shift-type keys for which S is greater than zero. The manner in which the F and L fields are generated at high level is dependent upon which of these two classifications applies to a UK being handled. For a left or no-shift-type UK, the generated CK has a factor field F equal to $E_{B_I}$, and a key-byte length field, L, equal to $E_{B_0}$ minus $E_{B_I}$ plus one.

On the other hand for a right-shift-type UK, the generated CK has a factor field, F, equal to $E_{A_I}$ plus one, and a key-byte length field, L, equal to $E_{B_0}$ minus $E_{A_I}$. The execution of these functions is represented by steps in the FIG. 5B in which the UK type is determined for high levels by steps 58 and 59, after step 51 determines the value of S. Step 58 determines no-shift and left-shift classification for high-level UK's; while step 59 determines righthift classification for high-level UK's. Steps 67 and 75 determine L and F from the left- and no-shift class, and steps 68 and 76 determine L and F from the right-shift class. It does not appear that the $L$=0 condition can occur for high-level CK's, as it does for the low-level CK's. This is because a one is added to the value of L for left-shift and no-shift CK's.

Tables E1, E2 and E3 respectively represent right-shift, left-shift and no-shift-type UK's at any high level ($I \neq 0$), and they are used to illustrate certain properties between the UK's and their CK's generated at high level.

In each Table E1-3, the underlined bytes in a UK represent its key bytes which are transferred into the respective CK. These CK key bytes extend from the X-byte on the left to the D-byte on the right within the UK. The number of underlined bytes is equal to the value of L for that CK, and the number of factored bytes to the left of the underlined bytes is equal to the value of F for the same CK. The bytes to the right of the underlined bytes may be truncated. The underlined bytes represent only the minimum key bytes for a CK at high level using the described embodiment. Any other bytes within the UK may also be included as key bytes consecutive with the key bytes within the UK. The latter nonoptimum condition extends up to using all bytes in the UK on either or both sides of the optimum key bytes shown underlined.

For the right-shift-type UK's in Table E1, the key bytes extend from the byte position following the X-byte position in the preceding UK and extend through the D-byte position in the current UK. Accordingly for right-shift-type high-level UK's, the highest-order key byte is dependent upon the X-byte position in the adjacent prior UK, and the lowest-order key byte D is the difference byte for that UK at lowest level ($I$=0).

In Table E1, the special case of a single key byte for a CK occurs for a right-shift UK, in which an X-shift of only a single-byte position occurs at the high level, and both D and X exist at the same byte position. Key Number 6 in Table E1 shows this special case.

Table E2 represents the left-shift type of compressed keys, and Table E3 represents the no-shift type, except initially in each table a full right-shift UK is shown to obtain the left-shift or no-shift sequence. For the left-shift or no-shift case, the key bytes for high level CK's extend from the X-byte position in the current UK through its D-byte position. The special case of a single-key byte for a CK also can occur for the left-shift and no-shift cases. For no-shift UK's this occurs when the X and D-bytes have the same position in the UK. For left-shift UK's, this occurs when only an X-shift of only a single-byte position occurs at the high level, and both D and X exist at the same byte position. For example, this is shown for key number 3 in TABLE E2 and for key numbers 3 and 4 in TABLES E3.

The byte positions following the X-byte positions are in effect noise bytes at the respective high level, even though these same bytes may be factored bytes or key bytes at the low level. These "noise" bytes in the high level CK's precisely define the boundary conditions existing between blocks at the lower levels, so that a search can trace a path through the levels to a required pointer in a particular block at the low-index level. This boundary definition assures insertion accuracy for a search argument not represented in the index.

The detailed embodiments shown herein provide a method for executing the discoveries illustrated with the use of TABLES D, and E1-3.

FIGS. 5A, 5B, 5C, 5D and 5E are flow diagrams of a detailed method embodiment for executing the invention either as a program on a general purpose digital computer, or with a special purpose computer, either of which can be developed by those skilled in the programming or computer hardware arts after a knowledge of the embodied method is acquired. A high-level compressed index generation method with upper-level-factoring dependency is first described herein. This upper-level dependency allows during searching the downward passing of high-order factor bytes from higher to lower levels. The method includes a sequence of acts which generate a multilevel index, including in its combination of acts the generation of compressed keys at low level in the manner as described in U.S. Pat. No. 3,593,309 (previously cited).

FIG. 1 illustrates the resulting form of the compressed-index structure. Each level of the index may comprise a plurality of records except the highest level of the index which may contain only a single record. The last record at each level I of the compressed index may have a last key represented by a control field having $L$=0 and $F$=0 followed by the last pointer in that level. The ends of the nonlast records at each level may be signified by an interrecord gap or other means for indicating the end of a logical record, such as any unique signal or character configuration.

Any index level is generally designated as I, in which the value of I is 0 for the lowest index level, 1 for the next higher index level, etc., without an upper limit for I except for the constraint of available storage space. The lowest index level ($I$=0) contains pointers (addresses) to data records representing the data base from which information records are to be retrieved. Each higher level ($I \neq 0$) of the index contain pointers to index blocks within the next lower level. Each index level having $I \neq 0$ may be referred to as a "high-index level," while the lowest index level having $I$=0 may be referred to as the "low-index level."

The following LEGEND defines the names and definitions of the storage fields or registers used in the embodiments described herein:

SYMBOL LEGEND FOR FIGURES 5A–E

| | |
|---|---|
| Y | Next UK byte in input stream |
| $C_Y$ | Byte count of next UK in input stream |
| $R_Y$ | Next pointer byte in input stream |
| A, B, S, and H | Registers in common area |
| X | Current index value |
| F | Number of factored bytes for current CK |

| | |
|---|---|
| L | Number of key bytes in current CK |
| T | 0 IFF L value of prior CK was zero for level I=0 only |
| UKR | Register for last read pointer from UK stream |
| R | Register for last allocated pointer |
| $L_R$ | Byte Length of pointer |
| D | Initial value of $Q_I$ |
| I | Current Level in operation |
| $Y_I$ | Register for current UK in area I |
| $Y_{I,X}$ | UK byte location X in register $Y_I$ |
| $C_I$ | Length in bytes of UK stored in register $Y_I$ |
| $E_{A_I}$ | Prior equal count at level I |
| $E_{B_I}$ | Current equal count at level I |
| $EOB_I$ | End of block trigger for level I (Set $EOB_I$=1 when level I block becomes full; Reset $EOB_I$=0 when first UK is read) |
| $Q_I$ | Offset for next byte location in $CIB_I$ |
| $BL_I$ | Size in bytes for $CIB_I$ |
| $CIB_I$ | Compressed index block for level I |
| $V_I$ | Byte location in $CIB_I$ at location $Q_I$+I |
| J | Byte offset within area I outside of $CIB_I$ |

Figure 3:
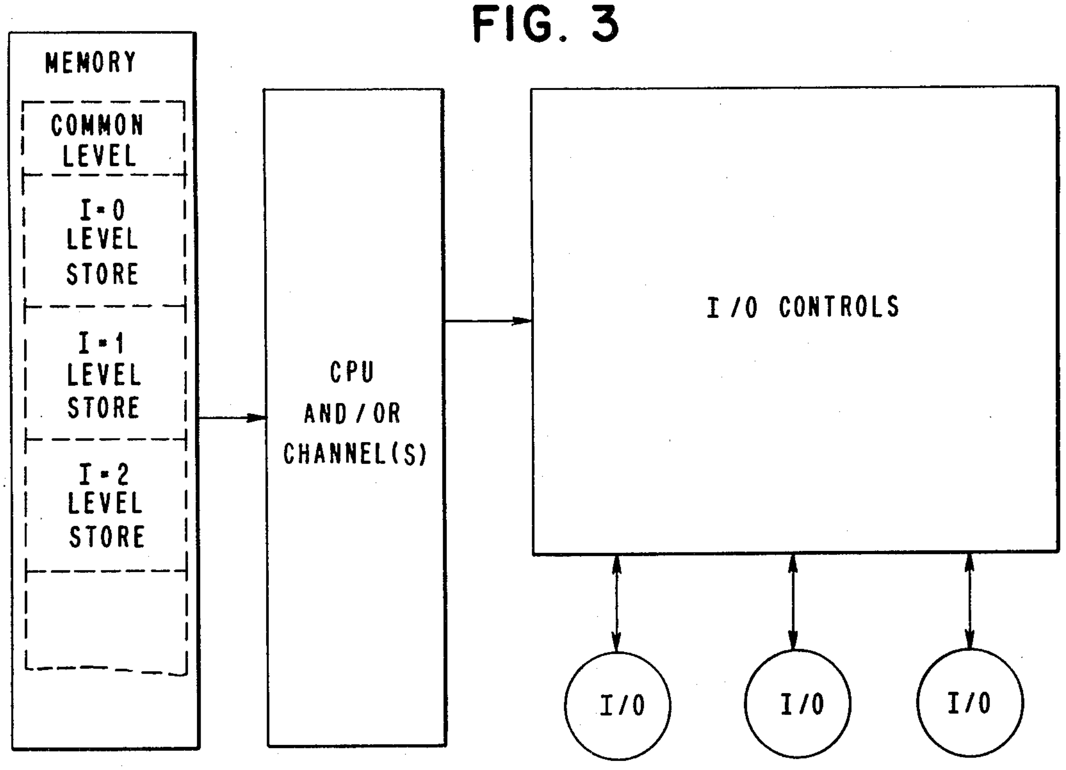
Figure 4A:
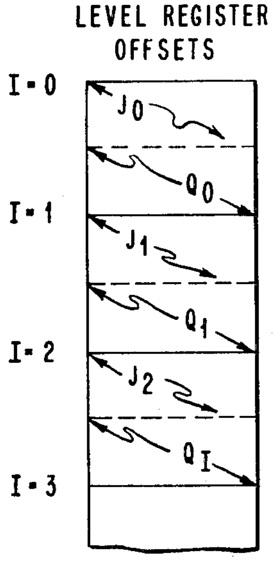
FIG. 4A represents an offset-addressing technique which may be used for the level registers represented in FIG. 3A.

FIG. 4C illustrates a program-constructed hardware storage structure used in the described embodiment and it may reside in the memory of the general purpose computer shown in FIG. 3. The storage structure in FIG. 4C includes a plurality of level areas (or registers) which are identical for each level I except for their unique level assignment shown as a subscript Also the top part storage structure shown above level 0 in FIG. 4C is used by any active level I, and it is called the "Common Area."

A typical level area in the storage structure is represented in FIG. 4C for level $I$=0. Each of the other level areas is identically structured to the level $I$=0 area, but it is used only for its assigned level operations. Thus in level 0, the first group of storage bytes provide a register $Y_O$ which is used to store each received uncompressed key (UK). Register $Y_O$ has a length sufficient to accommodate the largest expected UK. It may be for example 256 bytes in length but of course can accommodate any smaller size UK. Each inputted UK is assumed to be preceded with a single-byte field ($C_Y$) which represents the number of bytes of the immediately following UK in the input stream. Its value is posted into the storage structure field $C_0$ as shown. Two other single-byte fields are $E_{A_I}$, $E_{B_I}$ which are defined in the LEGEND. The register $EOB_I$ may be a single bit (magnetic core or trigger) which is set to a one whenever the corresponding compressed index block area $CIB_I$ has been filled; otherwise $CIB_I$ remains set to a zero. The field $Q_I$ represents the next sequential byte location available in $CIB_I$ for the corresponding level. The $Q_I$ value is an address offset from the beginning of the corresponding level I area. A storage field $BL_I$ represents the approximate maximum number of bytes which can be stored in the corresponding $CIB_I$ area, before it is outputted. The value $BL_I$ is in fact substantially less than the total storage area provided in the corresponding $CIB_I$ in order to permit completion and storage therein of any last compressed key and pointer being generated, which may in part exceed the $BL_I$ limit. The initial $Q_I$ value represents the first byte location in the corresponding $CIB_I$.

The common area shown above the $I$=0 component area is used by any active level I. The common area comprises a register UKR which receives each input stream pointer as it is received, following its associated UK in the input stream. Each UKR pointer represents the address of a data record and is then transferred from UKR into the $CIB_0$ area. The common register R receives each externally allocated pointer which is the address of an external location to which a currently full $CIB_I$ area will be transferred. The pointer in register R may represent an available storage area on any external storage device, such as tape, drum, disc, strip files, core, monolithic, or thin film auxiliary storage devices. $L_R$ represents the length of the pointer which may be stored in either register R or UKR. The common field D is used to initialize the value of $Q_I$ in each level area; it represents the offset from the beginning of the component area to the beginning of the corresponding $CIB_I$ area. The common register I represents the level I currently in operation and indicates the subscript I for the active area; a single byte of eight bits for register I limits the maximum number of levels to 256 which is adequate for most multilevel structures. At the end of an index-generation operation, the field I has a value which is one greater than the highest level subscript in the generated index, but is equal to the number of levels within the generated index.

Figure 4B:
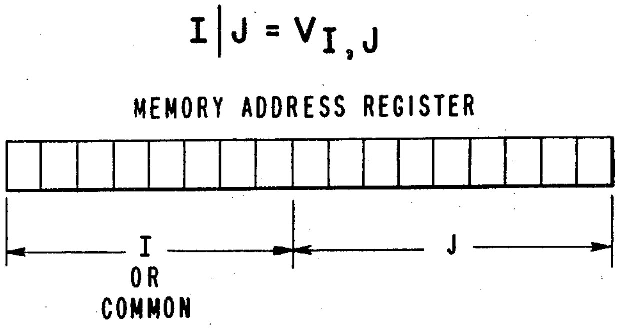
FIG. 4B illustrates a concatenated addressing technique which may be used for the level registers in FIGS. 4C where the register address boundaries are multiples of powers of two.

In some situations it is convenient to address the storage structure by concatenated address components. This requires binary-power addresses for the registers and fields in the storage structure. The concatentation-generated address is shown in FIG. 4B, where the active index level I provides the high-order address component I, and the low-order address component J is an offset address within the level I. By using binary-power addressing, the addressing in the overall system may be simplified in hardware systems which are tailored to optimally handle the subject invention. Such binary-boundary addressing requires the storage structure in FIG. 4C to be divided up into registers (or fields) which have a size (in bytes, characters or words) which is a power of two. Thus each storage structure component area for each level I would have a number of bytes of for example 2,048 ($2^{11}$) or 4,096 ($2^{12}$) bytes or any power of two. The subareas within each component area I would then have a byte size which is a smaller power of 2. For example, field $Y_0$ may have 256 ($2^8$) bytes, and some fields may have only one ($2^0$) bytes, such as $E_{A_I}$, $E_{B_I}$, and $C_I$.

In the example where each area I has $2^{12}$ bytes, the lowest-order address component J of the concatenated address comprises 12 bits to represent any offset address within the active level I area. The higher-order bits I in the concatenated address then represent the currently active level I, either directly or by table translation. The common area address can be represented by a special value for the I component in the address which is not used to represent any level I component area. Accordingly the contents of the register components I and J are concatenated to directly generate any required current address without the use of any adder circuit.

The operation of the flow diagrams in FIGS. 5A–5E is next described. The description covers four phases: (1) Initialization and reception of the first UK and its pointer, (2) Low-level compressed key operation, (3) High-level compressed key operation, and (4) End of index operation:

1. initialization and reception of the first UK and its pointer

Figure 5A:
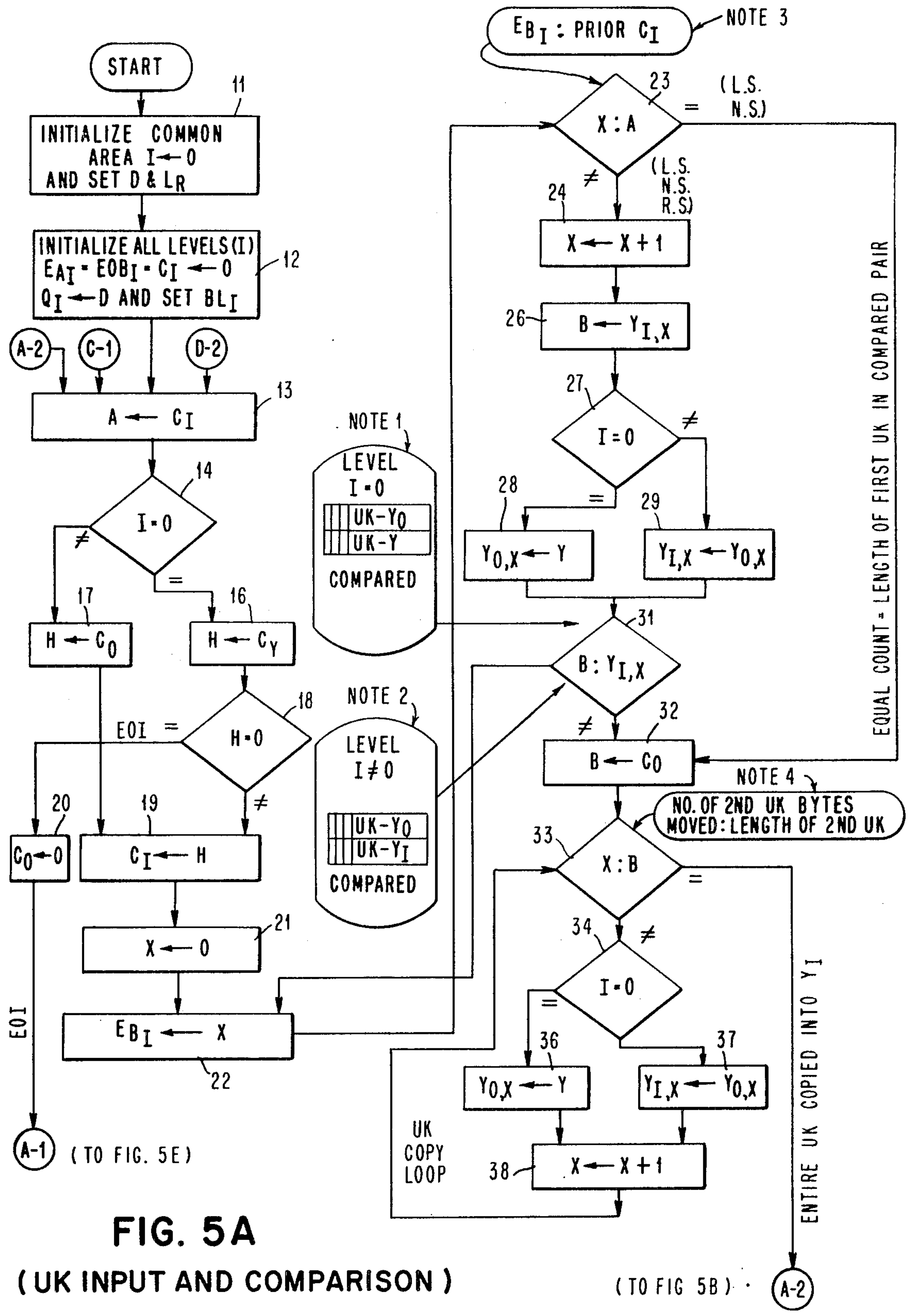
FIGS. 5A–E provide a specific method embodiment of the invention.

The flow diagram shown in FIG. 5A handles initialization and the processing for all UK's in the input stream. At the start of the process, step 11 initializes the common area by zeroing the common I field and setting the D and $L_R$ fields to predetermined values which may not change throughout the operation of the multilevel index generation. Then step 12 is entered which initializes all of the component areas within the storage structure assigned to the respective levels I, in which case each field $E_{A_I}$, $EOB_I$, and $C_I$ are set to zero; each field $Q_I$ is set to D found in the common area, and as each field $BL_I$ is set to the approximate length value required for each $CIB_I$ which may be generated in any component area.

Then step 13 is entered which sets $C_I$ (initially zero) into the common field A; initially $C_I$ is $C_0$, since index level $I$=0 is first used. Accordingly the field A is zero upon the reception of the first UK count in the UK stream. This is important for the initial operation in the process, and in particular at step 23.

Step 14 is entered for testing the current level I, which initially is level $I$=0. This initially causes step 16 to be entered, which reads the first byte in the input stream as the first count field for the first UK, and stores it into the common area H. Then step 18 tests whether H is zero which is only found at the end of the UK index stream as the end-of-index indication, in which case an exit is taken to FIG. 5E. If high-order zero is possible with any UK in the input stream, a special indicator other than zero should be provided as an end-of-index indicator. However within the UK-stream, H is not zero, and step 19 is entered so that the value in area H is transferred to the local area $C_I$ which initially is $C_0$. Then step 21 zeros the common index field X, and step 22 transfers this value in area X to the current $E_{BI}$ which initially is area $E_{BO}$.

Then step 23 compares the initial zero value in register A to the initial zero value in register X occurring after the first UK count byte is received. This provides an equal comparison which causes a jump to step 32. Step 32 transfers the first UK count byte found in area $C_0$ into register B. Then step 33 is entered which compares this nonzero value in register B to the initial zero value in register X, which causes an unequal exit to step 34 to begin a copy routine which causes all of the bytes of the first UK to be copied into area $Y_0$. Since $l$=0, step 34 exits to step 36 which causes the first input UK-byte, designated as Y, to be read into the first byte location in field $Y_0$ at the current index position designated by field X. Thus each byte position in $Y_0$ is designated by $Y_{0,X}$ as respective bytes are read into area $Y_0$. After the first Y byte is read, step 38 is entered which increments the index value of X by one, and a branch is taken back to step 33 which tests whether the entire UK has been copied into area $Y_0$. If not, an unequal exit is taken to step 34, and step 36 is entered again for reading the next UK-byte into the next $Y_{0,X}$ position since X was incremented from 0 to 1 by the prior operation of step 38. The UK copy loop recycles until step 33 finds that the entire UK has been copied into $Y_0$, in which case the value of X will have been incremented until it is equal to the $C_0$ value in register B representing the length of the current UK and the equal exit is taken from step 33.

Figure 5B:
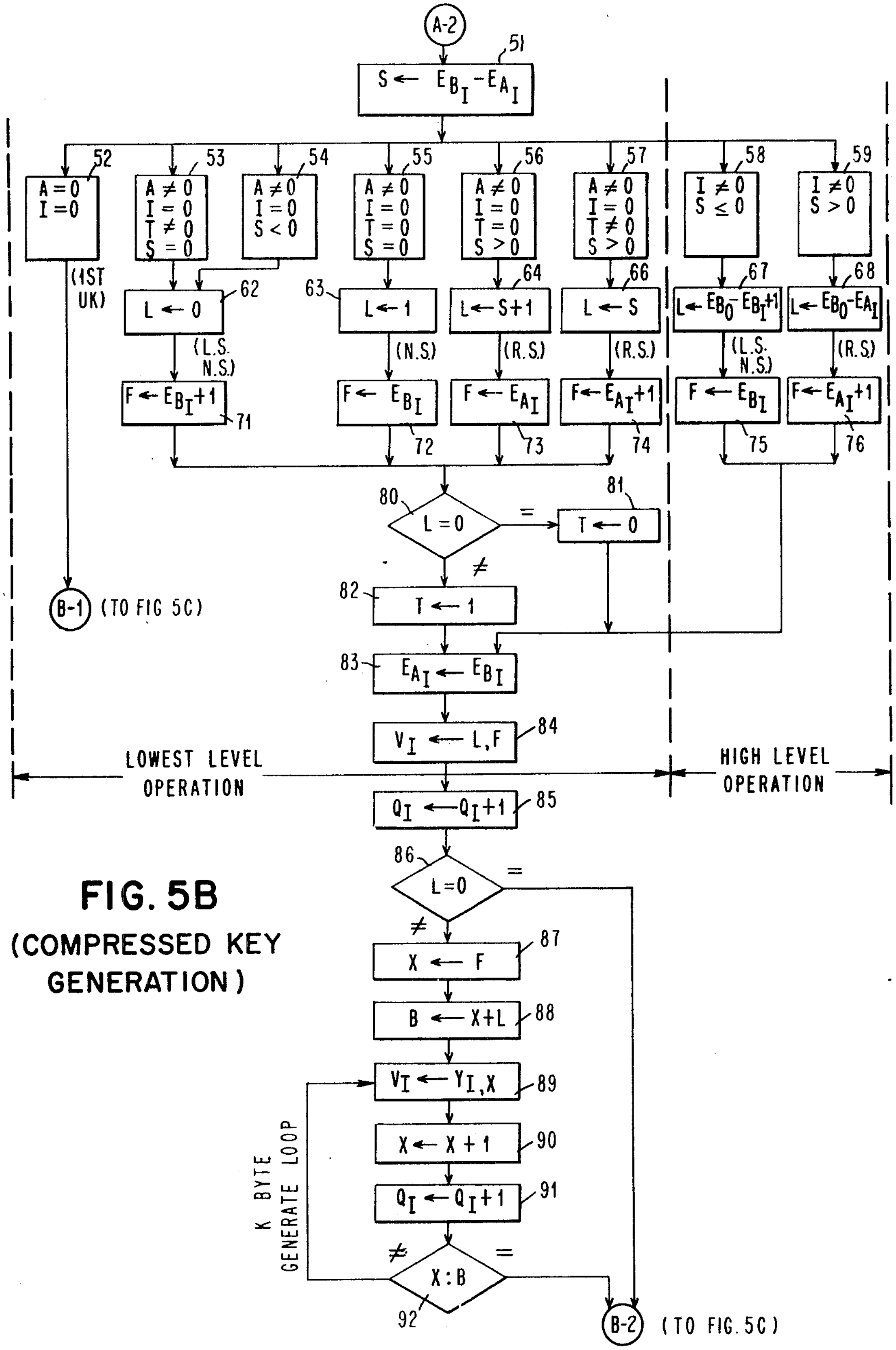

Then step 51 is entered in FIG. 5B which ordinarily will generate a compressed key from a current pair of uncompressed keys. However under these initial circumstances, only a single UK has been received thus far which is insufficient for generation of a compressed key. In this case step 51 finds that the S-field is zero since both the $E_{A_0}$ and $E_{B_0}$ fields are in their initial reset state of zero. Also register A still contains the zero value provided to it by prior step 13 in FIG. 5A, and level $l$=0. Hence the conditions for selection of step 52 exist to the exclusion of the conditions needed for selection of any of the other alternative steps 53–59, which may be entered from step 51.

Figure 5C:
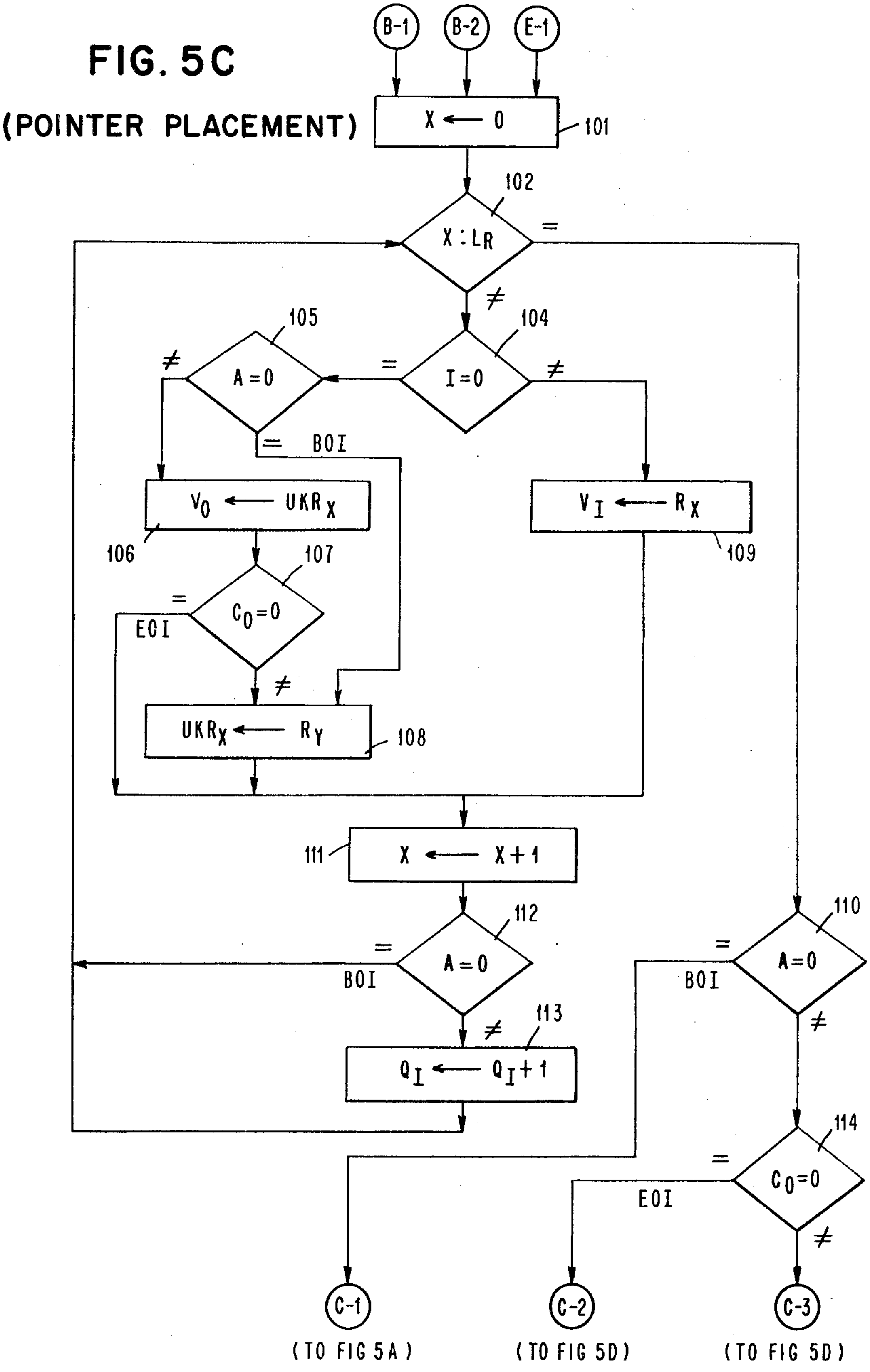

An exit to FIG. 5C is taken from path-selection step 51 in order to store the input stream pointer immediately following the first UK in register UKR in the common storage area, and then an exit from FIG. 5C is taken back to step 13 in FIG. 5A in preparation for reception of the second UK in the input stream.

In FIG. 5C, step 101 sets the indexing register X to zero in preparation for the pointer-byte transfers. Then step 102 is entered which compares the current register X value to the common area's pointer-length field $L_R$. If they are not equal, the next byte of the pointer remains to be transferred; and the unequal exit is taken to step 104, which at level $l$=0 enters step 105 which for the first UK in the input stream finds $A$=0. The equal exit is taken from step 105 to step 108, the current byte position $B_0$ in the compressed index block at the address represented by the current contents of field $Q_0$. Then step 108 reads the first pointer byte $R_Y$ (each read pointer byte is designated $R_Y$) from the input stream into the current index position X within the field UKR. Then step 111 is entered which increments the index register X in preparation for reading the next pointer byte. The step 112 is entered which finds $A$=0. The initial loop operation has cycled once and returns to step 102 for comparing the incremented value of X to the pointer length $L_R$. As long as they are unequal, the loop repeats placing the next received pointer byte $R_Y$ into the newly indexed position X in the field UKR. The iteration continues until step 102 finds contents of register X equal to the contents of the field $L_R$ in which case step 110 is entered which finds $A$=0 and exits to FIG. 5A, step 13.

In summary up to this time, initialization has occurred, the UK-input stream has read a first UK count byte into field $C_0$, the first UK has been stored into field $Y_0$, and the first pointer has been stored in common area UKR.

2. Low-level CK Operation:

After the first UK has been received the $C_0$ byte count field currently has the value of the length of the first UK length byte; it is this $C_0$ value which is put into field A by step 13 when it is reentered for the second time. Step 14 then passes the operation to step 16 (since $l$=0 still exits), which causes the next UK-byte of the input stream to be read into register H; the next byte being the byte count for the next UK, which will be the second UK in the input stream. Step 18 then determines that this UK-byte is nonzero, and step 19 is entered which transfers the nonzero byte to area $C_0$. Then step 21 zeros the register X in the common area, and step 22 transfers the zero value in register X to the $E_{B_0}$ field. The step 23 compares the zero index value in register X with the nonzero value of the former (first) $C_0$ value in register A. The unequal exit is taken from step 23 to step 24 which begins an equal-byte count loop operation accomplished by steps 23–31, and 22.

Step 24 is entered from step 23 to increment by one the value in register X, which adds one etc., the currently zero value to provide an index of one. The operation of steps 26–31 compares the corresponding byte positions in the newly received UK to the last UK stored in field $Y_0$; and this is done a byte at a time, as each byte of the current UK is being received from the input stream. As each byte of the current UK is received, it is overlayed in the same byte position in area $Y_0$ that the corresponding byte position of the prior UK occupied. Accordingly it is essential for comparison purposes that the overlayed byte of the old UK be saved for the comparison operation by the subsequent step 31. For this purpose register B is used, and step 26 causes the current indexed location in field $Y_0$ (designated as $Y_{0,X}$) to be stored in register B since currently $l$=0. Then step 27 causes step 28 to be entered which results in the reading of the next UK-byte Y into the same position $Y_{0,X}$ overlaying the byte last placed into register B. Then step 31 compares the prior UK byte in register B with the current UK byte in location $Y_{0,X}$ (which is the X'th byte position in the storage area $Y_0$).

The exit from comparison step 31 will differ according to whether the compared bytes were equal or not. If they are equal, the loop reiterates for the next UK-byte received. On the other hand, if they are unequal, an exit is taken from the loop to step 32.

In the case where the last-compared UK-bytes were found equal by step 31, step 22 is reentered and the current index value X is stored in field $E_{B_0}$; the current index value is one after the comparison of the first byte position of the first and second UK's. Then step 23 is entered which compares the new index value in register X to the first UK's byte count field $C_0$ remaining in register A. Then step 24 increments the value of X by one, which then has the value 2. Step 26 stores the second byte position in field $Y_0$ into register B, and step 28 is entered which causes the second byte of the second UK to be read into this same $Y_0$ byte position. Then step 31 compares the second byte of the received UK in the location $Y_{0,2}$ to the byte in register B. If they are equal a branch is taken back to step 22 to begin the next reiteration of the loop. On the other hand if unequal, step 32 will be entered.

As the equal count loop reiterates, a particular case may occur in which all of the bytes in the first UK are equal to the corresponding bytes in the second UK. In this case for ascending sequences, the second UK must contain more bytes than the first UK in the compared pair in order to collate correctly when low-order nulls are lowest in the collating sequence.

In the latter case, the first null at the low-order end (the assumed byte after the rightmost character) in the first UK in the compared pair will cause that byte position to compare low with any nonnull character in the second UK. The ascending sort of the UK's assures that the corresponding byte in the second (equal or longer) UK will be a nonnull character in the second UK. If the second UK were shorter than the first UK, a difference byte position must be obtained at one of the existing byte positions of the first UK. Accordingly whenever step 23 indicates all of the byte positions of the first UK are equal to the corresponding byte positions in the second UK of the compared pair, the index value in register X has become equal to the first UK's byte count in register A. The equal exit from step 23 is taken to step 32 which ends the equal-byte count loop operation with the X and $E_{B_0}$ fields each having the number of equal byte positions for the UK pair.

In any case when an exit is taken from the equal-byte count loop, the value of X indicates the highest-order unequal byte position in the compared pair as being the byte position after the highest index X-position, whether that position occurred at a byte position within the first UK or at the first position immediately following its lowest-order position. This exit value of X is one greater than the stored value of $E_{B_0}$, because X was incremented by step 24 before the loop exit from step 31 to step 32 was taken.

When step 33 is entered from step 32, another loop is initiated that causes the copying of any remaining bytes in the second UK (after its last equal byte position) into corresponding positions in the field $Y_0$. The $C_0$ value transferred to register B represents the byte length of the second UK of the current pair which is currently having its bytes received and stored into the area $Y_0$. Accordingly when step 33 is entered, a comparison is made between the highest-order unequal byte position (currently represented in index register X) with the length of the second UK field currently represented in register B. If they are equal, such as for example where the difference byte position is at the last byte of the second UK, all bytes of the second UK have already been copied into area $Y_0$; hence the equal exit from step 33 is taken to bypass the UK copy loop, and step 51 on FIG. 5B is entered.

On the other hand, if the equal byte position is not at the last byte of the second UK, the UK copy loop is entered when step 33 indicates an unequal condition, and step 34 is entered. With $I=0$ step 36 is entered and reads the next input UK-byte, designated as Y, into position $Y_{0,X}$ within the area $Y_0$. Then step 38 increments by one the index value in register X, and step 33 is reentered to determine if the last received byte position was the last byte of the current input UK. Eventually its last byte is read, and an exit is taken to step 51 in FIG. 5B.

In FIG. 5B, step 51 generates S by subtracting the values in the fields $E_{B_0}$ and $E_{A_0}$. The value S represents the difference between the number of equals in the current UK-pair and the number equals in the prior UK-pair. It may be zero, greater than zero or less than zero. Only a single one of the alternative steps 52–59 is next entered. Which of these steps 52–59 is chosen depends upon the relationship to zero of the values in the common area fields A, I, T and S. The fields A, I and T are only tested for the existence of zero or not-zero; while the field for S is tested not only for zero but also whether it is greater than or less than zero. The conditions of these values shown in FIG. 5B permit only one of the steps 52–59 to be chosen. During lowest level operation after the first pair of UK's has been received, only one of steps 53–57 can be chosen because $I=0$. Steps 52–57 are accordingly marked off in FIG. 5B as being for the lowest-level operation of the compressed key construction; while steps 58 and 59 are marked off in FIG. 5B for high-level operation in the compressed index construction. The lowest-level operation of steps 52–57 corresponds to the operation in U.S Pat. application Ser. No. 788,807 (previously cited) found therein in its FIG. 6A steps 17–26B and all of the exit paths therefrom to steps 30, 32, 34 and 36 which respectively correspond to steps 62, 63, 66 and 64 in the subject application. Also steps 31, 33, 35 and 37 of application Ser. No. 788,807 correspond to steps 71, 72, 74 and 73 in the subject application.

Hence in the prior way during lowest-level operation, the length field L in the subject FIG. 5B is generated by the entered one of steps 62–63; and the factor byte count field F in the subject FIG. 5B is generated when the corresponding one of steps 71–74 is entered.

During lowest-level operation, step 80 in FIG. 5B is entered from the executed one of steps 71–74. Step 80 tests whether the newly generated L field is zero or not. If zero, the T-field in the common area is set to zero by step 81 and step 83 is entered. On the other hand, if step 80 finds L is not zero, step 82 is entered which sets field T to one, and step 83 is then entered.

Step 83 transfers the contents of field $E_{B_0}$ to field $E_{A_0}$. Then step 84 is entered which stores the L and F-fields in the $CIB_0$ area at the location specified by the current offset value in the $Q_0$ field which has an absolute address $V_I$ to define the absolute location within the $CIB_0$ for the storage of L, F-fields. Then step 85 is entered with increments the $Q_0$ field by one, and the incremented value of $Q_0$ is stored into that field as the next byte position to be stored into $CIB_0$. The compact form of L, F disclosed in application Ser. No. 788,807 is used herein. The less compact form having L and F each occupy a separate byte location can easily be done as also disclosed in application Ser. No. 788,807.

Then step 86 tests the value in the common L-field for zero value to control the storage of any K-bytes needed from the UK currently in the area $Y_0$ into the $CIB_0$ area. If step 86 finds L equal to zero, no K-bytes are to be stored; and an exit is taken to step 101 in FIG. 5C.

On the other hand if L is not zero, step 86 exits to step 87 to begin a K-byte generate loop. Step 87 transfers the value in the common F field to the indexing register X to set the lower limit of the indexing transfer operation. Then step 88 is entered which sets the upper limit for the indexing transfer operation by adding the value in the L field to the value in the X field and transferring the sum to register B. Then step 89 transfers the byte in the $Y_0$ field currently indexed by the value in register X (which is byte $Y_{0,X}$) to the addressed location in $CIB_0$, represented by the offset currently in field $Q_0$ which has an absolute address of $V_I$. Then step 90 is entered which increments by one the index value X, and step 91 increments by one the offset address $Q_0$. Then step 92 compares the incremented value of X to the upper-limit value in register B. If the upper limit had not been reached, the unequal exit is taken from step 92 back to step 89 to transfer the next byte position from field $Y_0$ into the $CIB_0$ area, etc. until all required K bytes have been transferred, as is indicated when step 92 finds an equal condition and exits to step 101 in FIG. 5C.

In FIG. 5C, step 101 initially finds the system operating in level $I=0$. The pointers received in the input stream are sequentially stored in field UKR. The first UK's input pointer was stored into the UKR-field as previously described. When step 101 is reached for the second or later input pointer, the contents of UKR (which store the prior pointer) is first transferred to the compressed block area at the address $V_I$. Then the transferred contents of field UKR can be overlayed with the new pointer as it is received from the input stream. This is done in FIG. 5C after step 101 sets the indexing register X to zero in preparation for the pointer byte transfers. Then step 102 is entered which compares the current register X value to the common area's pointer-length field $L_R$. If they are not equal, the next byte of the pointer remains to be transferred; and the unequal exit is taken to step 104, which at level $I=0$ enters step 105, which for the second and later UK's is nonzero ($A \neq 0$), since its value is that of the prior UK $C_I$. The unequal exit is then taken from step 105 to step 106. The zero position of X initially accesses the first pointer byte in UKR-position, which is transferred to the current byte position $V_0$ in the $CIB_0$ at the offset address represented by the current contents of field $Q_0$. Then step 107 is entered which finds the field $C_0$ is not zero, since we have not reached the end of index, and then step 108 reads the first pointer byte $R_Y$ (each read pointer byte is designated $R_Y$) from the input stream into the current index position X within the field UKR, overlaying the byte readout by step 106. Then step 111 is entered to increment the index register X in preparation for reading the next pointer byte. Then step 112 finds $A \neq 0$, and step 113 increments the content of field $Q_I$ for addressing the next byte location in $CIB_0$. The loop operation has cycled, and it returns to step 102 for comparing the incremented value of X with the pointer length $L_R$. As long as they are unequal, the loop repeats placing the next received pointer byte $R_Y$ into the newly indexed position X in field UKR. The iteration continues until step 102 finds contents of register X equal to the contents of the field $L_R$ in which case step 110 is entered which finds $A \neq 0$ and exits to step 114 to test for end of index. If end of index has not been reached, an exit is taken to FIG. 5D, step 116 for determining if $CIB_0$ has become full.

Figure 5D:
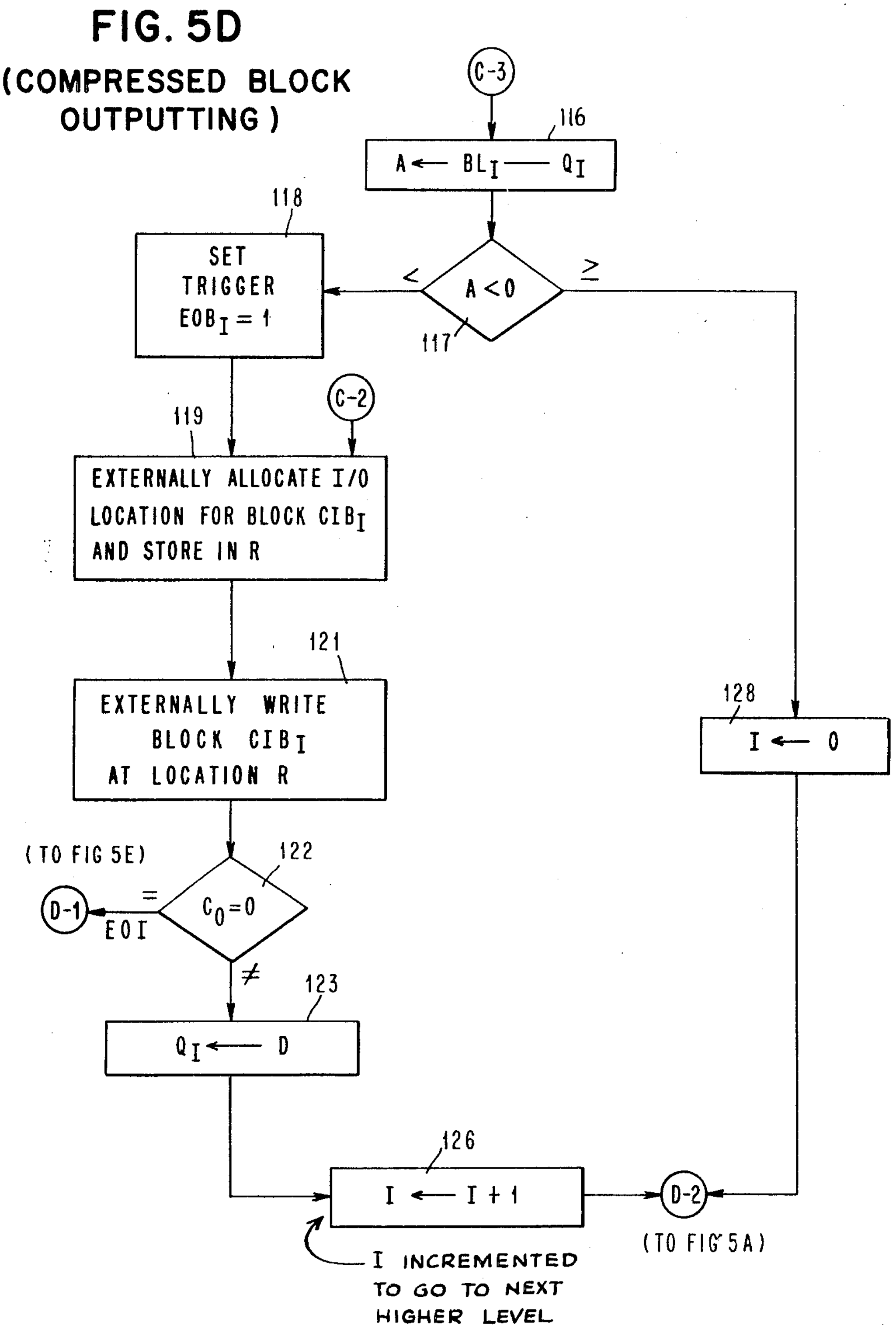

In FIG. 5D, steps 116 and 117 determine if the compressed index block at the current level is full. To do this at level $I=0$, step 116 subtracts the contents of fields $BL_0$ and $Q_0$ and places the subtracted value into register A. Then step 117 determines if the value in register A is less than zero, i.e., $Q_0$ has exceeded $BL_0$. If the content of A is less than zero, the compressed index block is full; there existed enough space to complete whatever transfer was needed for the current compressed key and its associated pointer.

The compressed-index block will not likely be full until after a substantial number of compressed keys and pointers are inserted into it; and step 117 will not then find the content of register A less than zero; and step 128 is entered to set $I=0$. Step 128 exits to step 13 in FIG. 5A for the reading and comparison of the next UK after which FIG. 5B is entered for the generation of the corresponding CK, after which FIG. 5C is entered for the placement of the pointer associated with that CK, and then FIG. 5D is entered for the determination of whether the block is full. Eventually, if the index is long enough, $CIB_0$ is filled, and step 117 in FIG. 5D indicates the content of register A has become less than zero. Then step 118 is entered which sets a single bit field $EOB_0$ to a one in the level zero component area to indicate that the $CIB_0$ has become full.

The next steps 119 and 121 pertain to obtaining an address on an I/O device and externally writing $CIB_I$ at that address. It is only when $CIB_0$ is full that a high-level index entry need be considered. Step 119 externally allocates the I/O location for the block $CIB_I$ and stores the allocated pointer in register R in the common area in FIG. 4C. External means is relied upon to allocate the location and space for the writing of a block from each area CIB. Such space allocation is commonly done in conventional programming and therefore will not be explained herein. An example (for memory used as a device) is the Get-Main macro-instructions used in the IBM-OS/360. Then step 121 externally writes block $CIB_I$ at the allocated location address stored in field R. Well known access-method programs are available for transferring such blocks to an I/O device such as is found in the publically released Basic Direct Access Method (BDAM) within the IBM-OS/360.

Then step 122 is entered which tests for end of index by examining whether field $C_0$ is zero or not. If not, the end of index has not been reached, and step 123 readjusts the value in field $Q_0$ by resetting it to the value in the common field D. Then step 126 increments I to the next higher level (i.e., I+1) and exits to FIG. 5A step 13 to begin the procedure for copying the UK from register $Y_0$ into register $Y_1$ to be used for construction of the first CK at level $I=1$.

FIGS. 5A, 5B, 5C and 5D operate at level $I=1$ to generate one CK-entry and pointer into $CIB_1$. Then step 128 in FIG. 5D returns the level back to $I=0$ for generation of the next $CIB_0$.

3. High-level CK Operation

In more detail when FIG. 5A is entered at level $I=1$, step 13 now accesses the field $C_1$ which initially is zero, and transfers that zero byte into register A. Step 14 next determines that $I \neq 0$, and step 17 is entered to transfer the current nonzero value in field $C_0$ into register H. The $C_0$ value will be the length of the last UK read during the generation of the last CK provided to the last outputted $CIB_0$. This value in register H is transferred to the field $C_1$ by step 19. Then step 21 zeros the index register X and step 22 places the zero index in the $E_{B_1}$ field. Step 23 is entered and finds that both the values in the X and A fields are zero and therefore equal. Accordingly an exit is taken from step 23 to step 32 which bypasses the equal-byte count loop in a similar manner to the operation previously described for the first UK in level $I=0$.

Step 32 transfers the value of $C_0$ field to register B to represent the length of the first UK at level $I=1$, and step 33 is entered. When step 33 finds the values of X and to be unequal, step 34 is entered and exits to step 37 because $I=1$. Step 37 causes the first UK-byte (the current index X is zero) in the $Y_0$ field to be copied into the $Y_1$ field. That is, byte $Y_{0,X}$ is copied into $Y_{1,X}$. Then step 38 increments the value of X by one in preparation for the next iteration of the loop for transferring the next byte from the $Y_0$ to the $Y_1$ field. When the transfer of the UK in $Y_0$ is complete, step 33 will find the index value X to be equal to B, and step 33 exits to FIG. 5B step 51 for generation of the first high-level CK.

Step 51 computes initially a zero value for S since both the $E_{B_1}$ and $E_{A_1}$ fields are zero. Then step 58 is entered since its conditions of $I \neq 0$ and $S=0$ are fulfilled, and step 67 generates the value of L by subtracting the current zero value in field $E_{B_1}$ from the current value in field $E_{B_0}$ which was the last computed value in the generation of the low-level block, and one is added to this value. Thus for the first L at high level, its value is $E_{B_0}$ plus 1. $E_{B_0}$ can be zero or nonzero. Then step 75 is entered which initially transfers the zero value in the field $E_{B_1}$ into field F.

Step 83 is entered from step 75, thereby bypassing the setting of the common area field T, which is only used at the level $I=0$. Step 83 generates the current value of $E_{A_1}$ by transferring into that field the current value in the $E_{B_0}$ field. Then step 84 writes the L and F-fields into the compressed index block $CIB_1$ for the current level $I=1$ at the current byte location $V_1$ which is determined by the offset value in field $Q_1$. Step 85 follows to increment the value in the $Q_1$ field. Then steps 86–92 control the writing of K-bytes, if any, from the $Y_1$ field into the $CIB_1$ area at byte locations $V_1$ from its indexed positions F to F plus L in the same manner as previously described for level $I=0$. Then an exit is taken to FIG. 5C for the transfer of the proper pointer into the $CIB_1$.

FIG. 5C operates as previously described for level $I=0$, except that I is not zero in this case. Accordingly step 109 is entered from step 104 to transfer the pointer from the common area R into $CIB_1$ at location $Y_1$ as determined by operation of the index register X on a byte by byte basis. $A \neq 0$ during this operation. When the placement is completed, an exit is taken from step 102 to step 110, and then to step 114 to test if end of index has been reached. If end of index has not been reached, step 116 is entered to test if the block $CIB_1$ has been filled by the last compressed key entry. If it has not been filled, step 117 exits to step 128. Since index level $I=1$ exists, step 128 sets the index level back to $I=0$. Then step 13 in FIG. 5A is entered to begin the generation of the next block at level $I=0$.

Hence the CK generation for level $I=1$ (and for all levels except level $I=0$) do not read any UK's as they are being inputted from the input stream. For all levels $I \neq 0$, each CK is generated by comparing the UK in $Y_I$ with the UK in $Y_0$.

At the beginning of the second and all succeeding blocks at the lowest level ($I=0$), the method in FIG. 5A operates as previously described.

The first CK for the second and later $CIB_0$ is generated by comparing the first input stream UK during the new $CIB_0$ generation with the last UK received for constructing the last outputted $CIB_0$, which is the UK currently stored in field $Y_0$. When this operation in FIG. 5B is completed, FIG. 5C is entered and the associated inputted pointer is placed in field UKR. Then step 116 in FIG. 5D is entered, step 128 is executed and an exit is taken to step 13 in FIG. 5A to received the next UK.

The operation continues to recycle in this way until either the end of index, or the current $CIB_0$ is filled as indicated by step 117 in FIG. 5D. In the latter case step 118 sets $EOB_0$ to one, and the newly filled $CIB_0$ is outputted to an I/O device at an address which is allocated and stored in pointer field R. If the end of index has not been reached, step 126 increments I to the next level I1, and an exit is taken to step 13 in FIG. 5A for the construction of the next CK in the $CIB_1$ at level $I=1$; and this is similar to that previously described.

Eventually the iterations previously described will cause the $CIB_1$ to be full, if a sufficient number of UK's are provided in the input stream. The EOB characteristic of $CIB_1$ is indicated when step 117 is reached and sets the field $EOB_1$ to a one. Then step 119 provides an external allocation of space on an I/O device wherever space exists for writing this $CIB_1$, and this external address is returned and stored in the common field R. Then the block $CIB_1$ is written in this externally allocated space at the address in location R, as previously explained with respect to step 121. Then if end-of-index has not been reached, step 126 is entered which increments the value of I to $I$=2, and an exit is taken to step 13 in FIG. 5A for generating the CK entry at level I2.

Hence step 13 in FIG. 5A is entered for transferring the $C_0$ value and UK value in $Y_0$ into $C_2$ and $Y_2$ respectively by steps 17, 29 and 37. Thus FIG. 5A executes as previously described for level $I$=1 except that the $I$=2 component fields are used. Step 51 in FIG. 5B is entered, and step 58 or 59 is then entered. FIG. 5B and then FIGS. 5C and 5D likewise execute as described for level $I$=1, except the level $I$=2 fields are used. In FIG. 5D, the step 117 exits to step 128. Step 128 resets I back to zero, and step 13 in FIG. 5A is entered. FIG. 5A then operates at level $I$=0 to generate the next $CIB_0$ from the UK input stream.

In this manner, another plurality of $CIB_0$ blocks will be generated until another $CIB_1$ block is full; and another entry is provided in $CIB_2$. This operation repeats until $CIB_2$ is full, and an entry is made in $CIB_3$ . By this process the levels can build to higher and higher values until any number of input stream UK's are structured into the compressed multilevel index.

(The field $EOB_I$ for $I \neq 0$ is used differently from the $EOB_0$ field; the latter being used to indicate the first input stream UK for generation of the second and following blocks at the lowest level $I$=0. However the higher level $EOB_I$ fields ($I \neq 0$) are used to later determine the highest index level which was generated when an end-of-index (EOI) is sensed. Hence no reset is provided for $EOB_I$ back to zero. The $EOB_I$ fields for $I \neq 0$ are scanned to find the level above the highest level with $EOB_I$ set to one. This highest level test is done by steps 138 and 139 in FIG. 5E.)

4. End of Index Operation

Eventually an end-of-index (EOI) indication in the input UK-stream is reached which is a zero (or other special character indication) as the $C_Y$ field following the pointer with the last UK in the input stream. Level I-O must exit when EOI is first sensed. When the EOI indication is reached, it is first sensed by step 18 in FIG. 5A after it is read by step 16 into field H. Step 18 tests each UK-byte-count byte; and if $C_y$ is equal to zero, and end-of-index exit is taken to step 20, which places the zeros in $C_0$ then an exit is taken to FIG. 5E, where step 131 causes a zero to be placed in fields L and F. Step 132 transfers the L and F values to the compressed index block area $V_I$. Then step 132 increments the value of $Q_I$ by one in preparation for the storage of the pointer into $CIB_I$. Step 132 exits to the pointer placement routine in FIG. 5C to write the last pointer in field UKR into $CIB_I$. FIG. 5C operates as previously explained for level $I$= 0, except that when step 114 is reached, the $C_0$ value is found to be zero; since step 20 in FIG. 5A has posted the zero $C_Y$ byte into the $C_0$ area. Accordingly step 114 in FIG. 5C exits to step 119 in FIG. 5D for external space allocation for whatever bytes exist in block $CIB_0$. In a special case where the last UK of the input stream filled $CIB_0$ and it was written out by the prior iteration through FIG. 5D, no bytes will exit in $CIB_0$ when step 119 is reached. Nevertheless an external area is allocated by step 119 since it is essential to write an end-of-index indicator into it. This latter case will rarely happen, but the operation of the system nevertheless must account for its happening. After step 121 externally writes the block at location R, an exit occurs at step 122 which indicates end-of-index by testing the $C_0$ field and finding that it is zero, in which case it exits to step 137 FIG. 5E.

Figure 5E:
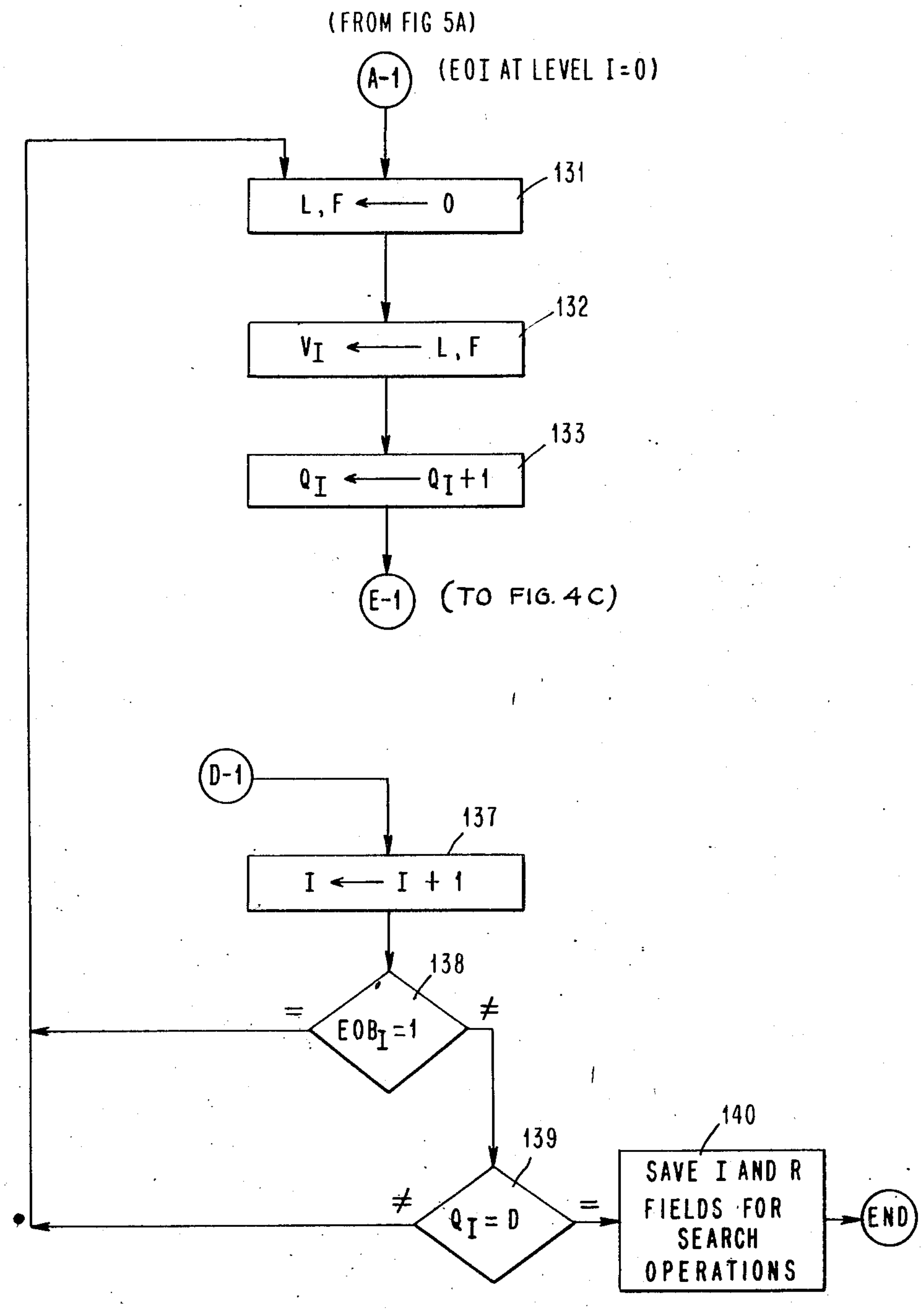

In FIG. 5E, step 137 increments I in order to go to the next higher level of operation, and step 138 is entered to check the $EOB_I$ field in the next higher level component area. If this $EOB_I$ field contains a one, it indicates that this Ith level has completed at least one compressed index block, and that an end-of-index indication is needed at that level. Accordingly if the $EOB_I$ field has been used, a branch is taken to step 131 in FIG. 5E which causes the posting of a zero in the L, F fields in the common area, then step 132 posts this all zero field of the next byte locations $V_I$, in the $CIB_I$ for that level. Then the $Q_I$ field is incremented by one, and an exit is taken to step 101 in FIG. 5C. The pointer is placed by the process in FIG. 5C for $I \neq 0$, in which case step 109 transfers the prior place pointer in the R register to the $V_I$ byte positions in the current $CIB_I$ block for that level. The exit from step 114 is taken to FIG. 5D step 119 which allocates external space, and writes its address in field R. Then step 121 writes the last $CIB_I$ into that external space.

The step 122 exits again to step 137 in FIG. 5E which increments I to the next higher level, so that the ending procedure repeats for each higher level having one bit in its field $EOB_I$.

The EOI iterations end after step 138 finds an $EOB_I$ field in which the original reset state of zero exists, indicating that that level is the lowest level which has not had its $EOB_I$ filled during the compressed index construction operation. In this case, step 139 is entered from step 138, and a verification of $CIB_I$ use is made by comparing the $Q_I$ field to the common D field; they would be equal only if that level has not been used; and if this is true, the operation is ended. However if $Q_I$ and D are not equal, an EOI indication must be posted in $CIB_I$; hence a branch is taken from step 139 to 131 which writes a zero L and F field into $CIB_I$ at $V_I$, and FIG. 5C is entered for placement of the last pointer in field R. FIG. 5D then externally stores this highest-level $CIB_I$ and returns to FIG. 5E step 137, which increments I to one level higher, which has its $EOI_I$=0, and step 139 finds $Q_I$=$D$; the index construction processing is then ended.

The compressed index has now been generated and placed into any available external space on I/O devices where it is available for subsequent searching. The allocated space can be randomly non-contiguous, and may be scattered on different devices. The last pointer value in the common area R is the address of the highest level block of the index; and it should be recorded in a known location so that the scattered index on the I/O device (or devices) can be entered for searching, or other, purposes.

Figure 6:
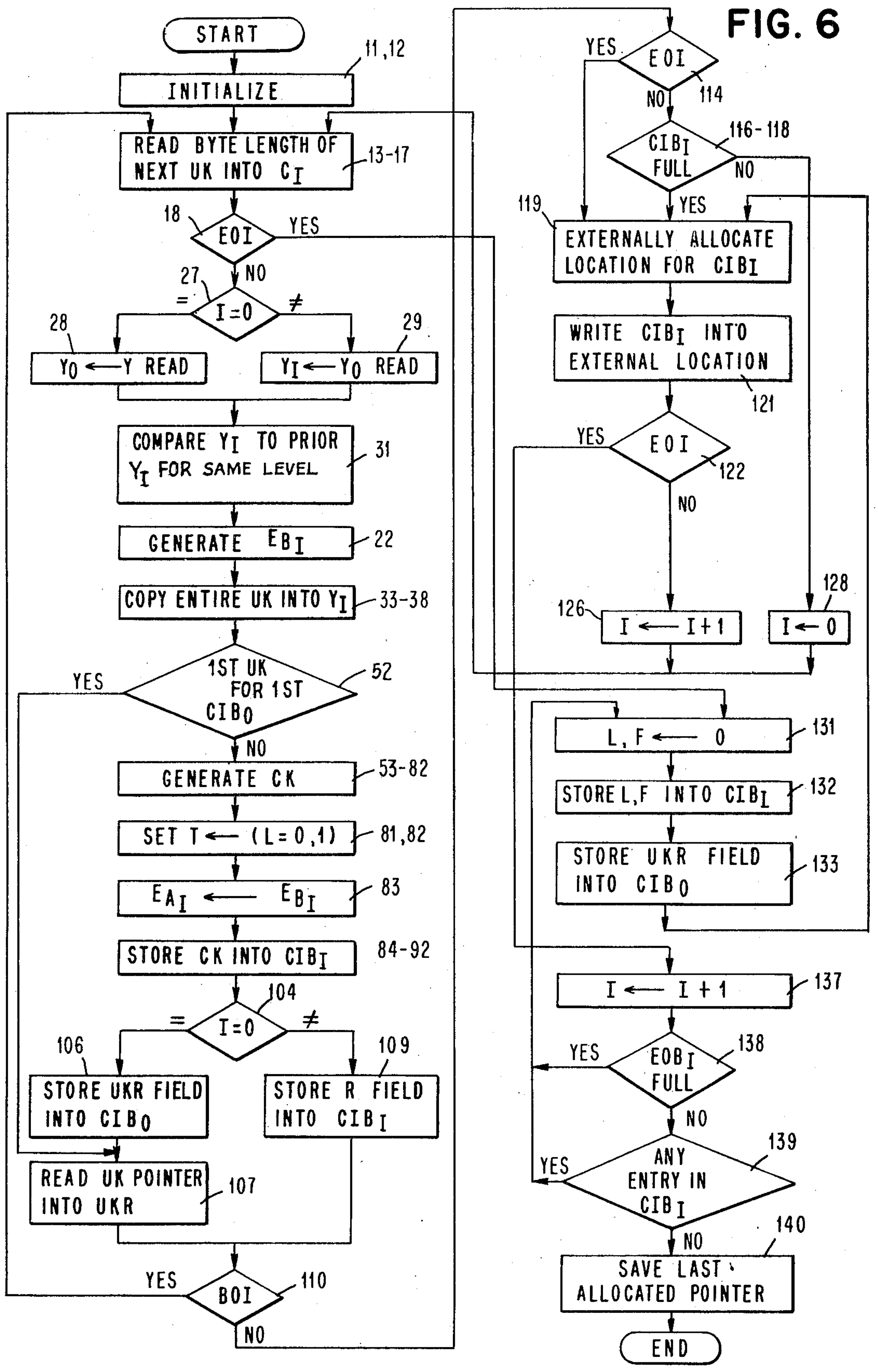
FIG. 6 provides a more general embodiment of the invention.

FIG. 6 is a flow diagram summarizing the major operations found within FIGS. 5A-E by consolidating or eliminating many of the "housekeeping" steps. The essential key-compression operations are also not detailed in FIG. 6. The same reference numbers are used in FIG. 6 as are used in FIGS. 5A-E in order to show their relationship.

Figure 7:
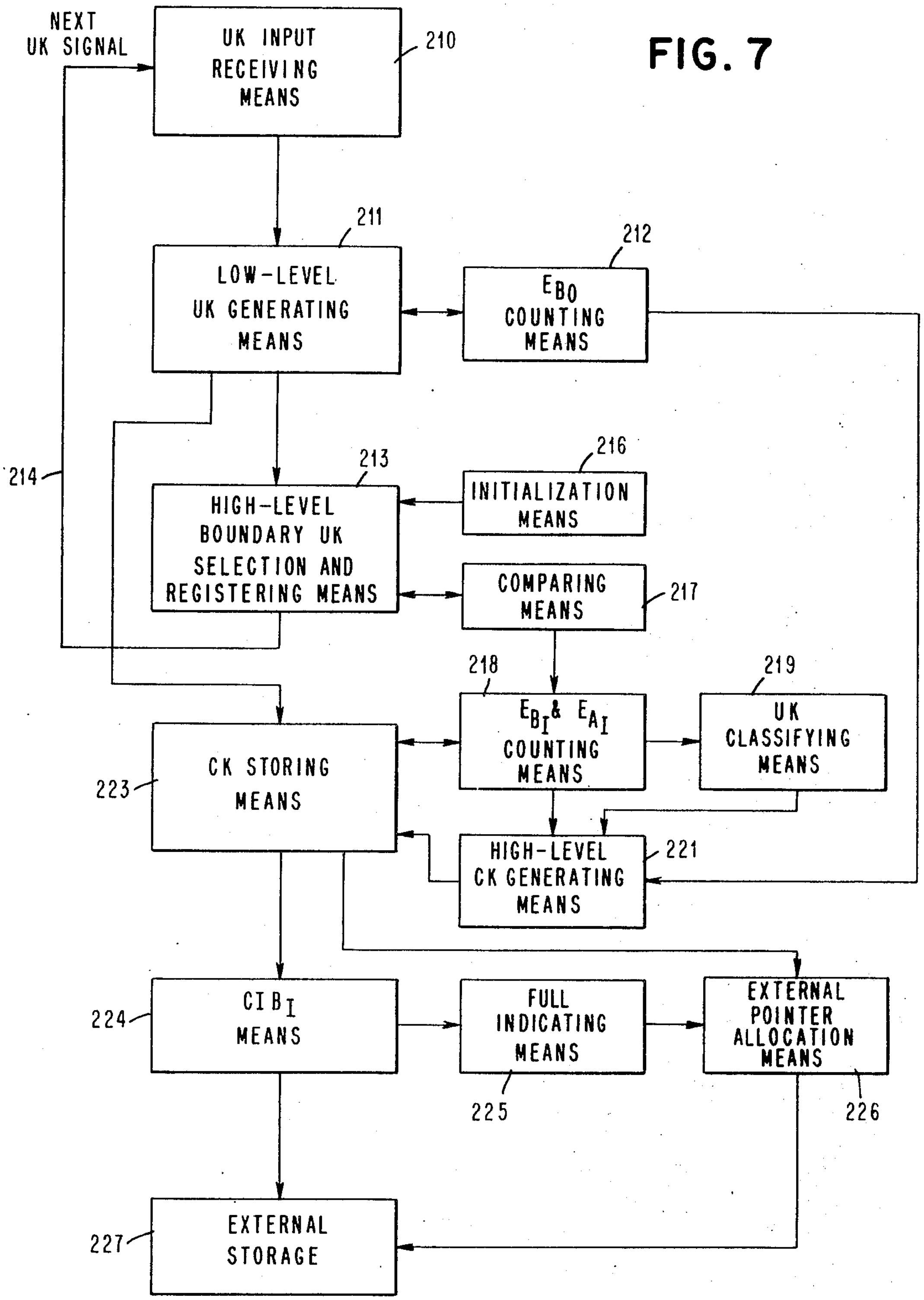
FIG. 7 is a special purpose embodiment.

FIG. 7 illustrates a special purpose embodiment which may execute the method previously described herein, and which is composed of special purpose means 210–217 which perform the same functions previously described for the method. The labeling of the means 210–227 is descriptive of their functions. Thus means 210 receives the UK-stream and provides UK's to means 211 which generates the low level CK's. Counting means 212 generates $E_{B_0}$ and feeds it back to means 211 to participate in the CK-generation. Then means 213 selects the boundary UK's and registers then for generation of higher level CK's therefrom. After initialization to a null condition for the first UK at each used high level, comparing means 217 receives the current last two higher level UK's from means 213 and is connected to counting means 218 that generates the current equal count $E_{B_I}$ and prior equal count $E_{A_I}$ for high-level CK generation by means 221. The CK's at level I are stored by means 223 into a $CIB_I$ by means 224. Means 225 signals when $CIB_I$ is completed to means 226 which allocates external storage space and a pointer thereto. Then external storage 227 places the completed $CIB_I$ into the allocated space using the pointer address.

While the invention has been particularly shown and described with reference to preferred embodiments thereof, it will be understood by those skilled in the art that the forgoing and other changes in form and details may be made therein without departing from the spirit and scope of the invention.

What is claimed is:

1. An iterative method of generating a multilevel compressed index comprising:

machine-reading an input stream of uncompressed keys, low-level machine-generating compressed keys from said input stream of uncompressed keys, machine-assembling said low-level compressed keys in low-level index blocks, machine-transferring to a high level a last of said uncompressed keys handled by said low-level machine-generating step for generating a last low-level compressed key provided by said machine-assembling step for each current low-level index block, and high-level machine-generating each compressed key for a high-index level from each last two of said uncompressed keys provided by said machine-transferring step, and factoring from said last uncompressed key any common high-order bytes among the uncompressed keys used in the generation of the low-level index block for which said last uncompressed key was used.

2. A method as defined in claim 1 including the step of:

machine-initialization at the start of said method simulates a null uncompressed key as the first uncompressed key acted upon by said high-level machine-generating step.

3. A method as defined in claim 1 in which said high-level machine-generating step includes machine-counting at said low-level the number of consecutive high-order byte positions which are equal in said last uncompressed key and its prior adjacent uncompressed key in the input stream to provide a low-level equal-count.

4. A method as defined in claim 3 in which said high-level machine-generating step includes machine-comparing like-ordered byte positions in each of said last two uncompressed keys acted upon by said high-level machine-generating step, machine-indicating the number of consecutive high-order byte positions found equal by said machine-comparing step to provide a high-level equal count.

5. A method as defined in claim 4 including machine-storing the last indicated high-level equal-count and its prior high-level equal-count obtained by said machine-indicating step to provide a current equal-count and a prior equal-count for said high-level.

6. A method as defined in claim 5 including machine-determining if the current high-level equal-count is less than, equal to, or greater than the prior high-level equal-count for respectively indicating said last uncompressed key as a left-shift, no-shift, or right-shift type at said high level.

7. A method as defined in claim 6 for generating a compressed key at said high-level from said last uncompressed key which is indicated as a left-shift or no-shift type by said machine-determining step, including:

machine-recording said current equal-count for said high-level as a factor field for said compressed key.

8. A method as defined in claim 6 for generating a compressed key at said high-level from said last uncompressed key which is indicated as a left-shift or no-shift type by said machine-determining step, including:

machine-copying into said compressed key at least one byte from said last uncompressed key between its byte positions signalled by said high-level current equal-count and said low-level equal-count.

9. A method as defined in claim 6 for generating a compressed key at said high-level from said last uncompressed key which is indicated as a left-shift or no-shift type by said machine-determining step, including:

machine-adding "one" to a difference between said low-level equal-count and the high-level current equal-count to generate a key-byte length for said compressed key.

10. A method as defined in claim 8, including:

machine-recording into said compressed key a key-byte length field by signalling a count of the number of bytes copied by said machine-copying step.

11. A method as defined in claim 6 for generating a compressed key at said high-level from said last uncompressed key which is a right-shift type, including:

machine-adding "one" to the last high-level equal-count to generate a factor field for said compressed key.

12. A method as defined in claim 6 for generating a compressed key at said high-level from said last uncompressed key which is indicated as a right-shift type by said machine-determining step, including:

machine-copying into said compressed key the bytes from said last uncompressed key between its byte position signalled by said high-level prior equal-count and its byte position signalled by said low-level equal-count.

13. A method as defined in claim 6 for generating a compressed key at said high-level from said last uncompressed key which is indicated as a right-shift type by said machine-determining step, including:

machine-subtracting said high-level prior equal-count from said low-level equal-count to generate a key-byte length field for said compressed key.

14. A method as defined in claim 1 for generating high-levels in said index in which said machine-transferring step also iteratively transfers said last uncompressed key for each current low-level index block to each sequentially next higher level in said index above each level at which said last uncompressed key is also used in generating a last compressed key that completes an index block.

15. A method as defined in claim 14 for generating one or more high levels in said index, including the steps of:

allocating a separate registering field for processing each level in said index, registering each uncompressed key provided by said machine-transferring step into one of said separate registering fields assigned to each sequentially next higher level for receiving said uncompressed keys, and, within said high-level machine-generating step, iteratively generating a compressed key for each high level currently registering an uncompressed key by operating on the currently transferred uncompressed key and the prior uncompressed key provided by said registering step for the same level by a prior operation of said machine-transferring step for the same level.

16. An iterative high-level compressed index generation method for generating a multilevel compressed index of compressed index blocks, comprising the steps of:

machine-reading an input stream of sorted uncompressed keys, machine-selecting, for high-level compressed index generation, each of said uncompressed keys which is the last uncompressed key used in the generation of a low-level compressed index block, including the steps of:

machine-indicating when a compressed index block is completed at each level in said index, and iteratively machine-transferring to a next high level in the index the last uncompressed key inputted by said machine-reading step when said machine-indicating step signals a completion of a compressed index block for the adjacent lower level in said index.

17. A high-level compressed index generation method as defined in claim 16, including:

machine-comparing the last two uncompressed keys provided by said machine-transferring step to the same high-level for generating a compressed key for a compressed index block in said same high-level.

18. A high-level compressed index generation method as defined in claim 17, including the step of:

machine-initialization upon the start of said method by simulating a null uncompressed key as the first uncompressed key for each high-level.

19. An iterative high-level compressed index generation method as defined in claim 17 including in response to said machine-comparing step acting for a particular high-level compressed index block, further comprising:

machine-counting the number of consecutive high-order equal-byte positions existing in said last two uncompressed keys provided for a particular high-level to generate a current equal-count for said particular high-level, and machine-storing each current equal-count as a prior equal-count for said particular high-level after generation of a control field for a current compressed key for said particular high-level compressed index block.

20. A high-level compressed index generation method as defined in claim 17 including:

machine-classifying a last received of said last two uncompressed key for said high-level as a left-shift or no-shift type, or a right-shift type in accordance with the direction of change in the existing current equal-count in relation to an immediate prior equal-count for said high-level, the left-shift or no-shift type having a decrease or no change in the equal-count, while the right-shift type increases in equal count.

21. A high-level compressed index generation method as defined in claim 20 for a left-shift or no-shift type of said last received uncompressed key, including:

machine-moving, for a high-level compressed key, each byte of said last received uncompressed key from a byte position determined by the current equal-count for said high-level through a byte position determined by an equal-count for the same uncompressed key when compared to its prior uncompressed key in the input stream, whereby said machine-moving step generates a key byte component of the high-level compressed key currently being generated for the compressed index block at said high level.

22. A high-level compressed index generation method as defined in claim 21 for a left-shift or no-shift type of said last received uncompressed key, including:

machine-recording a control field for the high-level compressed key currently being generated, which includes the substep of:

machine-storing, for said control field, said current equal-count and a byte count of the number of bytes transferred by said machine-moving step, whereby said current equal-count is a factor field, and said byte count is a key-byte-length field.

23. A high-level compressed-index generation method as defined in claim 20 for a right-shift type of said last received uncompressed key for said high-level, including:

machine-moving, for a high-level compressed key, each byte of said last received uncompressed key from a byte position determined by a prior equal-count for said high-level through a byte position determined by an equal-count for the same uncompressed key when compared to its prior uncompressed key in the input stream, whereby said machine-moving step generates a key byte component of the high-level compressed key currently being generated.

24. A high-level compressed index generation method as defined in claim 20 for a right-shift type of said last received uncompressed key for said high-level, including:

machine-recording a control field for the high-level compressed key currently being generated, which includes the substep of:

machine-storing for said control field a factor field comprising said prior equal-count incremented by one, and a key-byte-length field comprising a byte count of the number of bytes transferred by said machine-moving step.

25. A high-level compressed index generation method as defined in claim 20, including:

controlling said machine-reading step to input a next uncompressed key from said input stream in response to generation of a high-level compressed key which does not complete a compressed index block.

26. A high-level compressed index generation method as defined in claim 20, including:

machine-allocating a pointer to a storage area for each compressed-index block in response to generation of each next high-level compressed-key representing said compressed index block, and machine-storing said compressed index block at an address represented by said pointer.

27. A system for generating a multilevel compressed index comprising:

means for reading an input stream of uncompressed keys, means for iteratively generating low-level compressed keys from said input stream of uncompressed keys, means for assembling said low-level compressed keys in low-level index blocks, means for iteratively transferring to a high-level a last of said uncompressed keys handled by each said low-level machine generating a last low-level compressed key provided by said machine-assembling step for each current low-level index block, and means for iteratively generating a high-level compressed key for a high index level from each last two of said uncompressed keys provided by said transferring means, and means for factoring from said last uncompressed key any common high-order bytes among the uncompressed keys used in the generation of the low-level index block for which said last uncompressed key was used.

28. A system as defined in claim 27, including:

means for initializing to a null condition each register for receiving uncompressed keys acted upon at each high-level.

29. A system as defined in claim 27 in which said means for generating a high-level compressed key, including:

means for counting at said low-level the number of consecutive high-order byte positions which are equal in said last uncompressed key and its prior adjacent uncompressed key in the input stream to provide a low-level equal-count.

30. A system as defined in claim 29 including:

means for comparing like-ordered byte positions in each of said last two uncompressed keys acted upon by said high-level generating means, means for indicating the number of consecutive high-order byte positions found equal by said comparing means to provide a high-level equal-count.

31. A system as defined in claim 30 including:

means for storing the last indicated high-level equal-count and its prior high-level equal-count obtained by said indicating means to provide a current equal-count and a prior equal-count for said high-level.

32. A system as defined in claim 31 including:

means for determining if the current high-level equal-count is less than, equal to, or greater than the prior high-level equal-count for respectively indicating said last uncompressed key as a left-shift, no-shift, or right-shift type at said high level.

33. A system as defined in claim 32 for generating a compressed key at said high-level from said last uncompressed key which is indicated as a left-shift or no-shift type by said machine-determining means, including:

means for recording said current equal-count for said high-level as a factor field for said compressed key.

34. A system as defined in claim 32 for generating a compressed key at said high-level from said last uncompressed key which is indicated as a left-shift or no-shift type by said machine-determining means, including:

means for copying into said compressed key at least one byte from said last uncompressed key between its byte positions signalled by said high-level current equal-count and said low-level equal count.

35. A system as defined in claim 32 for generating a compressed key at said high-level from said last uncompressed key which is indicated as a left-shift or no-shift type by said machine-determining means, including:

means for adding "one" to a difference between said low-level equal-count and the high-level current equal-count to generate a key-byte-length for said compressed key.

36. A system as defined in claim 34, including:

means for recording into said compressed key a key-byte length field by signalling a count of the number of bytes copied by said copying means.

37. A system as defined in claim 32 for generating a compressed key at said high-level from said last uncompressed key which is a right-shift type, including:

means for adding "one" to the last high-level equal-count to generate a factor field for said compressed key.

38. A system as defined in claim 32 for generating a compressed key at said high-level from said last uncompressed key which is indicated as a right-shift type by said machine-determining means, including:

means for copying into said compressed key the bytes from said last uncompressed key between its byte position signalled by said high-level prior equal-count and its byte position signalled by said low-level equal-count.

39. A system as defined in claim 32 for generating a compressed key at said high-level from said last uncompressed key which is indicated as a right-shift type by said machine-determining means, including:

means for subtracting said high-level prior equal-count from said low-level equal-count to generate a key-byte length field for said uncompressed key.

40. A system as defined in claim 27 for generating high-levels in said index in which said transferring means also iteratively transfers said last uncompressed key for each current low-level index block to each sequentially next higher level in said index above each level at which said last uncompressed key is used in generating a last compressed key that completes an index block.

41. A system as defined in claim 40 for generating one or more high-levels in said index, including:

means for allocating a separate-registering field for processing each level in said index, means for registering each uncompressed key provided by said machine-transferring means into the one of said separate registering fields assigned to each sequentially next higher level receiving said uncompressed key, and, within said high-level generating means, means for iteratively generating a compressed key for each high-level currently registering an uncompressed key by operating on the currently transferred uncompressed key and the prior uncompressed key provided by said registering means for the same level by a prior operation of said machine-transferring means for the same level.

42. An iterative high-level compressed index generation system for generating a multilevel compressed index of compressed index blocks, comprising:

means for reading an input stream of sorted uncompressed keys, means for selecting for high-level compressed index generation each of said uncompressed keys which is the last uncompressed key used in the generation of a low-level compressed index block, including means for indicating when a compressed index block is completed at each level in said index, and iterative means for transferring to a next high-level in the index the uncompressed key last inputted by said reading step means in response to said indicating means signalling a completion of a compressed index block for the adjacent lower level in said index.

43. A high-level compressed index generation system as defined in claim 42, including:

means for comparing the last two uncompressed keys provided by said machine-transferring means to the same high-level for generating a compressed key for a compressed index block in said same high-level.

44. A high-level compressed index generation system as defined in claim 43 including:

means for initializing upon the start of said system by simulating a null uncompressed key as the first uncompressed key for each high-level.

45. An iterative high-level compressed index generation system as defined in claim 43 including in response to said comparing means acting for a particular high-level compressed index block, comprising:

means for counting the number of consecutive high-order equal-byte positions existing in said last two uncompressed keys provided for said high-level to generate a current equal-count for said high-level, and means for storing each current equal-count as a prior equal-count after generation of a control field for a current compressed key for said high-level compressed index block.

46. A high-level compressed index generation system as defined in claim 43 including:

means for classifying the last received of said last two uncompressed key for said high-level as a left-shift or no-shift type, or a right-shift type in accordance with the direction of change in the existing current equal-count in relation to the prior equal-count for said high-level, whereby the left-shift or no-shift type has a decrease or no change in the equal-count, while the right-shift type increases in equal-count.

47. A high-level compressed index generation system as defined in claim 46 for a left-shift or no-shift type of said last received uncompressed key, including:

means for moving for a high-level compressed key each byte of said last received uncompressed key from a byte position determined by the current equal-count for said high-level through a byte position determined by an equal-count for the same uncompressed key when compared to its prior uncompressed key in the input stream, whereby said moving means generates a key-byte component of the high-level compressed key currently being generate for the compressed index block at said high-level.

48. A high-level compressed index generation system as defined in claim 47 for a left-shift or no-shift type of said last received uncompressed key, including:

means for recording a control field for the high-level compressed key currently being generated, which includes the means of:

means for storing for said control field said current equal-count and a byte count of the number of bytes transferred by said moving means, whereby said current equal-count is a factor field, and said byte count is a key-byte-length field.

49. A high-level compressed index generation system as defined in claim 47 for a right-shift type of said last-received uncompressed key for said high-level, including:

means for moving for a high-level compressed key each byte of said last received uncompressed key from a byte position determined by a prior equal-count for said high-level through a byte position determined by an equal-count for the same uncompressed key when compared to its prior uncompressed key in the input stream, whereby said moving means generates a key byte component of the high-level compressed key currently being generated.

50. A high-level compressed index generation system as defined in claim 47 for a right-shift type of said last received uncompressed key for said high-level, including:

means for recording a control field for the high-level compressed key currently being generated, which includes means for storing for said control field a factor field comprising said prior equal-count incremented by one, and a key-byte length field comprising a byte count of the number of bytes transferred by said moving means.

51. A high-level compressed index generation system as defined in claim 47, including:

means for reading a next uncompressed key from said input stream in response to generation of a high-level compressed key which does not complete a compressed index block.

52. A high-level compressed index generation system as defined in claim 47, including means for allocating a pointer to a storage area for each compressed index block in response to generation of each next high-level compressed-key representing said compressed index block, and means for storing said compressed index block at an address represented by said pointer.

* * * * *

UNITED STATES PATENT OFFICE

CERTIFICATE OF CORRECTION

Patent No. 3,646,524 Dated February 29, 1972

Inventor(s) William A. Clark, IV et al.

It is certified that error appears in the above-identified patent and that said Letters Patent are hereby corrected as shown below:

The present Front Page and Columns 9 to 20, Column 27 and Column 28, should be cancelled and the attached sheets substituted therefor, as part of the Letters Patent.

Signed and sealed this 13th day of August 1974.

(SEAL)
Attest:

McCOY M. GIBSON, JR.
Attesting Officer

C. MARSHALL DANN
Commissioner of Patents

RM PO-1050 (10-69)

USCOMM-DC 60376-P69
★ U.S. GOVERNMENT PRINTING OFFICE : 1969 O—366-334.